United States Patent
Jensen et al.

(10) Patent No.: US 10,792,639 B2
(45) Date of Patent: Oct. 6, 2020

(54) RECONFIGURABLE CHEMICAL SYNTHESIS SYSTEMS AND METHODS

(71) Applicant: Massachusetts Institute of Technology, Cambridge, MA (US)

(72) Inventors: Klavs F. Jensen, Lexington, MA (US); Dale Arlington Thomas, III, Hampden, ME (US)

(73) Assignee: Massachusetts Institute of Technology, Cambridge, MA (US)

( * ) Notice: Subject to any disclaimer, the term of this patent is extended or adjusted under 35 U.S.C. 154(b) by 131 days.

(21) Appl. No.: 15/953,983

(22) Filed: Apr. 16, 2018

(65) Prior Publication Data

US 2018/0311638 A1 Nov. 1, 2018

Related U.S. Application Data

(60) Provisional application No. 62/490,565, filed on Apr. 26, 2017.

(51) Int. Cl.
  *B01J 19/00* (2006.01)
  *B01L 3/00* (2006.01)

(52) U.S. Cl.
  CPC ......... *B01J 19/0093* (2013.01); *B01J 19/004* (2013.01); *B01L 3/502* (2013.01);
  (Continued)

(58) Field of Classification Search
  CPC .............. B01J 19/004; B01J 2219/0788; B01J 2219/0889; B01J 2219/0894;
  (Continued)

(56) References Cited

U.S. PATENT DOCUMENTS

| 3,953,136 A | 4/1976 | Hach |
| 4,593,939 A * | 6/1986 | Blaseck ................ F16L 39/00 285/124.3 |

(Continued)

FOREIGN PATENT DOCUMENTS

| WO | WO 01/89681 A2 | 11/2001 |
| WO | WO 2004/011134 A1 | 2/2004 |

(Continued)

OTHER PUBLICATIONS

International Search Report and Written Opinion dated Aug. 7, 2018 for Application No. PCT/US2018/027750.

(Continued)

*Primary Examiner* — Seth W. MacKay-Smith
(74) *Attorney, Agent, or Firm* — Wolf, Greenfield & Sacks, P.C.

(57) ABSTRACT

Aspects of the present disclosure relate to reconfigurable chemical synthesis systems and related components and methods. In one aspect, a fluidic system comprises a plurality of fluid outlets, a plurality of fluid inlets, a plurality of tensioners, and a plurality of flexible conduits associated with the plurality of tensioners, wherein at least one flexible conduit of the plurality of flexible conduits is configured to fluidically connect a fluid outlet of the plurality of fluid outlets and a fluid inlet of the plurality of fluid inlets. Another aspect relates to a method in which ends of a plurality of flexible conduits are physically moved along paths, one after the other, prior to flowing material through the flexible conduits, after which the ends of the flexible conduits are again physically moved.

5 Claims, 16 Drawing Sheets

(52) U.S. Cl.
CPC .............. *B01J 2219/00788* (2013.01); *B01J 2219/00795* (2013.01); *B01J 2219/00889* (2013.01); *B01J 2219/00894* (2013.01); *B01J 2219/00905* (2013.01); *B01L 3/561* (2013.01); *B01L 2200/026* (2013.01); *B01L 2200/028* (2013.01); *B01L 2400/0487* (2013.01)

(58) Field of Classification Search
CPC .......... B01J 2200/026; B01J 2200/028; Y10T 137/87249
See application file for complete search history.

(56) References Cited

U.S. PATENT DOCUMENTS

| | | | | |
|---|---|---|---|---|
| 4,626,005 A | * | 12/1986 | Stifter | E04H 4/065 285/124.4 |
| 4,669,758 A | * | 6/1987 | Feller | F16L 39/06 285/94 |
| 4,754,993 A | * | 7/1988 | Kraynick | F16L 37/56 285/124.4 |
| 5,149,017 A | * | 9/1992 | McEntire | B64F 1/305 14/71.5 |
| 5,316,347 A | * | 5/1994 | Arosio | E02F 3/3654 285/26 |
| 5,464,121 A | * | 11/1995 | Jones | B01L 3/0293 137/115.03 |
| 5,683,118 A | | 11/1997 | Slocum | |
| 5,863,801 A | * | 1/1999 | Southgate | B01L 3/50273 422/417 |
| 6,455,316 B1 | * | 9/2002 | Turner | B01F 15/00207 374/E13.001 |
| 6,548,026 B1 | * | 4/2003 | Dales | B01F 15/00207 374/E13.001 |
| 6,585,296 B1 | * | 7/2003 | Picha | F16L 19/00 285/124.1 |
| 6,673,316 B1 | * | 1/2004 | Okamoto | B01J 19/004 422/63 |
| 6,727,096 B1 | * | 4/2004 | Wang | B01F 15/00207 374/E13.001 |
| 6,890,491 B1 | * | 5/2005 | Feygin | B01J 19/0046 422/129 |
| 7,056,477 B1 | * | 6/2006 | Schwalbe | B01J 19/0093 422/105 |
| 7,150,994 B2 | * | 12/2006 | Bergh | B01J 4/00 436/37 |
| 7,185,490 B2 | * | 3/2007 | Smatloch | F01N 13/10 277/591 |
| 7,435,392 B2 | * | 10/2008 | Oberbeck | B01F 5/0604 422/129 |
| 7,445,023 B2 | * | 11/2008 | Czerniak | C23C 16/45544 118/715 |
| 7,703,812 B2 | * | 4/2010 | Asam | E02F 9/2275 285/38 |
| 7,938,451 B2 | * | 5/2011 | Taillon | F16L 3/22 285/121.3 |
| 8,075,022 B2 | * | 12/2011 | Blassmann | F15B 13/0814 285/325 |
| 8,091,931 B2 | * | 1/2012 | Hinz | B60T 8/368 285/124.1 |
| 9,028,773 B2 | | 5/2015 | Ganesan | |
| 9,101,903 B2 | * | 8/2015 | Zikeli | B01J 19/0093 |
| 9,126,202 B2 | * | 9/2015 | Lobet | B01L 9/527 |
| 9,458,485 B2 | * | 10/2016 | Schultz | C12P 19/34 |
| 2002/0163187 A1 | * | 11/2002 | Pelfrey | F16L 37/0925 285/124.1 |
| 2003/0219363 A1 | * | 11/2003 | Kobylecki | B01J 19/004 422/600 |
| 2007/0144967 A1 | | 6/2007 | Guenther et al. | |
| 2009/0282978 A1 | | 11/2009 | Jensen et al. | |
| 2012/0076692 A1 | * | 3/2012 | Miraghaie | B01J 19/0093 422/49 |
| 2012/0141999 A1 | * | 6/2012 | Park | B01L 3/502715 435/6.12 |
| 2013/0048742 A1 | * | 2/2013 | Menden | F24F 1/0003 236/49.3 |
| 2013/0074614 A1 | * | 3/2013 | Holmes | B01L 3/50825 73/864.01 |
| 2013/0078733 A1 | * | 3/2013 | Holmes | B01L 3/0217 436/174 |
| 2013/0168955 A1 | * | 7/2013 | Finkenzeller | F16L 1/26 285/124.1 |
| 2016/0305972 A1 | * | 10/2016 | Ogg | B01L 3/502738 |
| 2018/0043320 A1 | * | 2/2018 | Ramsay | B01J 19/0093 |
| 2019/0091696 A1 | * | 3/2019 | Vollenweider | G01N 1/312 |

FOREIGN PATENT DOCUMENTS

| | | |
|---|---|---|
| WO | WO 2010/132412 A2 | 11/2010 |
| WO | WO 2012/170594 A2 | 12/2012 |
| WO | WO 2014/116756 A1 | 7/2014 |
| WO | WO 2016/025803 A1 | 2/2016 |
| WO | WO 2017/192595 A1 | 11/2017 |

OTHER PUBLICATIONS

Invitation to Pay Additional Fees dated Jun. 13, 2018 for Application No. PCT/US2018/027750.

International Preliminary Report on Patentability for Application No. PCT/US2018/027750 dated Nov. 7, 2019.

* cited by examiner

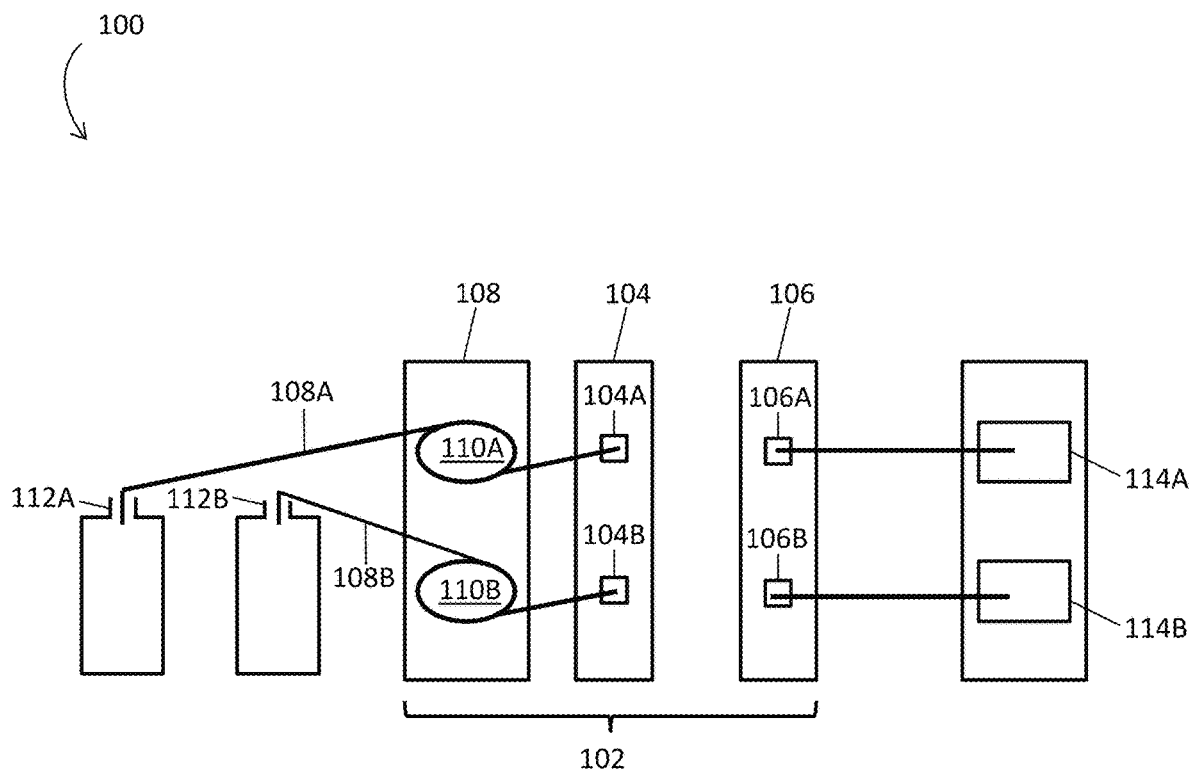
FIG. 1A
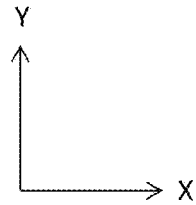

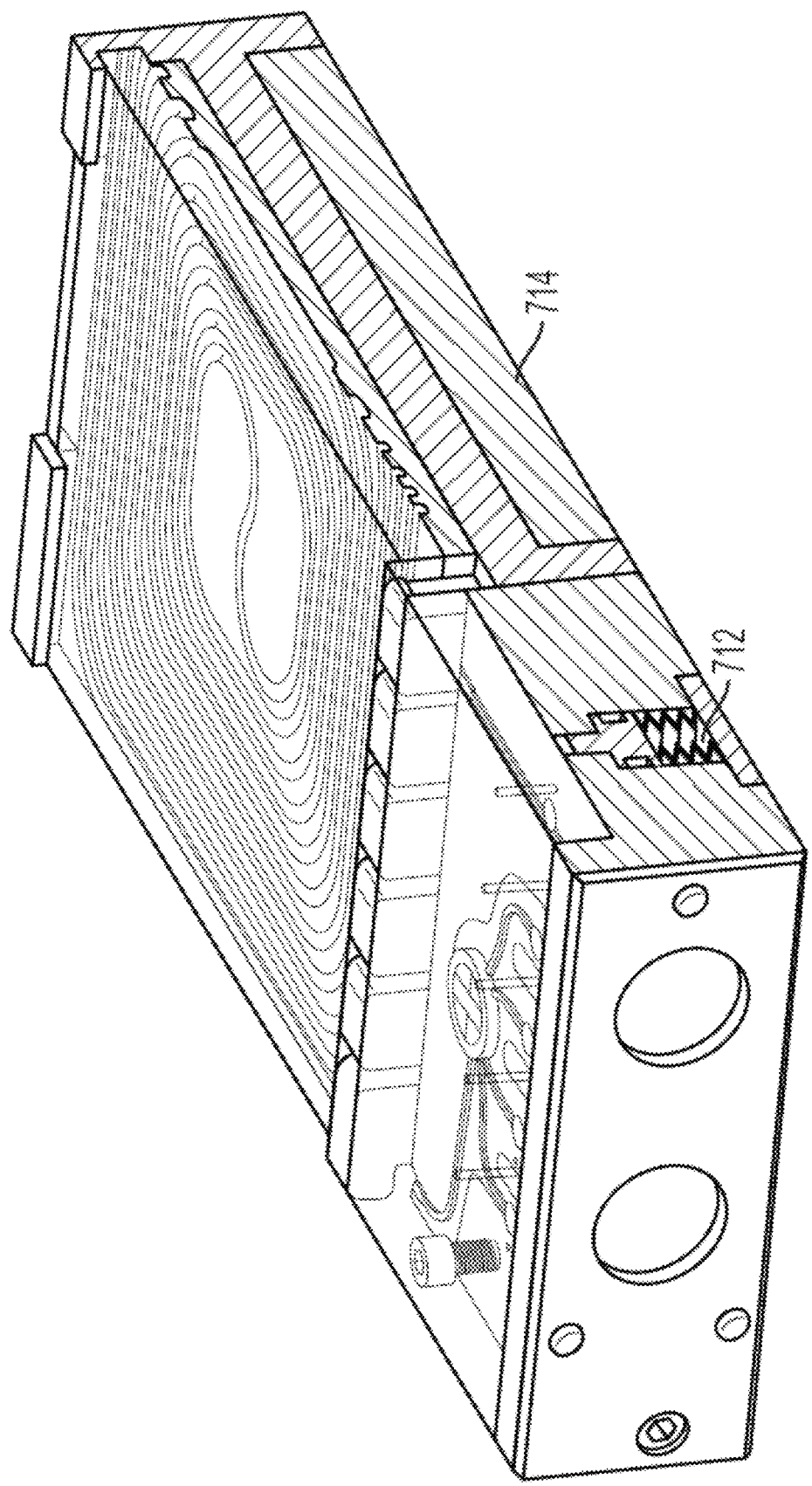

RECONFIGURABLE CHEMICAL SYNTHESIS SYSTEMS AND METHODS

RELATED APPLICATIONS

This application claims priority under 35 U.S.C. § 119(e) to U.S. Provisional Application No. 62/490,565, filed Apr. 26, 2017, and entitled "Reconfigurable Chemical Synthesis Systems and Methods," which is incorporated herein by reference in its entirety for all purposes.

GOVERNMENT FUNDING

This invention was made with Government support under Grant No. W911NF-16-2-0023 awarded by the Army Research Office. The Government has certain rights in the invention.

FIELD

The present invention generally relates to reconfigurable systems and methods for chemical synthesis.

BACKGROUND

Synthetic chemistry has been the driving force behind advances in fields ranging from pharmaceutical products to advanced materials. However, the field has struggled with a slow pace of discovery and difficulty scaling up syntheses of promising new chemical compounds. Although efforts to automate chemical synthesis have achieved mixed success, with bead-based and batch processes enabling automated production of small amounts of certain chemical compounds, these processes have not become widely accepted due to scaling difficulties and/or high capital costs. Accordingly, improved chemical synthesis systems and methods are needed.

SUMMARY

The present invention generally relates to reconfigurable systems and methods for chemical synthesis. The subject matter of the present invention involves, in some cases, interrelated products, alternative solutions to a particular problem, and/or a plurality of different uses of one or more systems and/or articles.

Certain aspects relate to a fluidic system. According to certain embodiments, the fluidic system comprises a first plurality of fluid outlets, a first plurality of fluid inlets, and a first fluid connector unit comprising a first plurality of flexible conduits. In certain embodiments, at least one flexible conduit of the first plurality of flexible conduits is configured to fluidically connect a first fluid outlet of the first plurality of fluid outlets and a first fluid inlet of the first plurality of fluid inlets.

Certain aspects relate to a method. According to certain embodiments, the method comprises providing a first fluidic connection between a first fluid outlet and a first fluid inlet through a first flexible conduit; providing a second fluidic connection between a second fluid outlet and a second fluid inlet through a second flexible conduit after providing the first fluidic connection; and disconnecting the second fluidic connection prior to disconnecting the first fluidic connection.

According to some embodiments, the method comprises physically moving a first end of a first flexible conduit from a first storage port of a first fluid connector unit to a first receiver port of the first fluid connector unit along a first path. In certain embodiments, the first flexible conduit provides a first fluidic connection between a first fluid outlet and a first fluid inlet. In certain cases, the first fluid outlet is in fluid communication with a source of a first reagent and the first fluid inlet is in fluid communication with a first module. In some embodiments, the method comprises physically moving a first end of a second flexible conduit from a second storage port of the first fluid connector unit to a second receiver port of the first fluid connector unit along a second path after physically moving the first end of the first flexible conduit along the first path. In certain embodiments, the second flexible conduit provides a second fluidic connection between a second fluid outlet and a second fluid inlet. In certain cases, the second fluid outlet is in fluid communication with a source of a second reagent and the second fluid inlet is in fluid communication with a second module. In some embodiments, the method comprises flowing the first reagent from the source of the first reagent to the first module. In some embodiments, the method comprises flowing the second reagent from the source of the second reagent to the second module. In some embodiments, the method comprises physically moving the first end of the second flexible conduit from the second receiver port to the second storage port prior to physically moving the first end of the first flexible conduit from the first receiver port to the first storage port.

According to some embodiments, the method comprises physically moving a first end of a first flexible conduit from a first storage port of a first fluid connector unit to a first receiver port of the first fluid connector unit along a first path. In certain embodiments, the first flexible conduit provides a first fluidic connection between a first fluid outlet and a first fluid inlet. In some embodiments, the method comprises physically moving a first end of a second flexible conduit from a second storage port of the first fluid connector unit to a second receiver port of the first fluid connector unit along a second path after physically moving the first end of the first flexible conduit along the first path. In certain embodiments, the second flexible conduit provides a second fluidic connection between a second fluid outlet and a second fluid inlet. In some embodiments, the method comprises determining whether a first vector between the first storage port and the first receiver port overlaps a second vector between the second storage port and the second receiver port. In some embodiments, the method comprises physically moving the first end of the second flexible conduit from the second receiver port to the second storage port prior to physically moving the first end of the first flexible conduit from the first receiver port to the first storage port when the second vector overlaps the first vector.

According to some embodiments, the method comprises configuring a system to synthesize a first chemical compound. In some embodiments, configuring the system to synthesize the first chemical compound comprises providing a first plurality of fluidic connections in an ordered sequence. In certain embodiments, each fluidic connection comprises a flexible conduit extending from a storage port of a fluid connector unit to a receiver port of a fluid connector unit. In some embodiments, configuring the system to synthesize the first chemical compound comprises storing data associated with each fluidic connection of the first plurality of fluidic connections. In certain embodiments, the associated data comprises an order value and at least one data value associated with a location of the storage port and/or the receiver port in one or more first data structures. In some embodiments, the method comprises reconfiguring the system to synthesize a second chemical compound. In some embodiments, reconfiguring the system comprises providing data associated with a second plurality of proposed fluidic connections. In some embodiments, reconfiguring the system comprises comparing the data associated with the second plurality of proposed fluidic connections with the data associated with the first plurality of fluidic connections to identify fluidic connections of the first plurality of fluidic connections that are incompatible with any proposed fluidic connection of the second plurality of proposed fluidic connections. In some embodiments, reconfiguring the system comprises adding data associated with each incompatible fluidic connection to one or more second data structures. In some embodiments, reconfiguring the system comprises calculating, for each fluidic connection of the first plurality of fluidic connections, a vector between the storage port and the receiver port of the fluidic connection. In some embodiments, reconfiguring the system comprises adding data associated with a fluidic connection of the first plurality of fluidic connections to the one or more second data structures when the vector of the fluidic connection overlaps a vector of at least one incompatible fluidic connection and the order value of the fluidic connection is higher than the order value of the at least one incompatible fluidic connection. In some embodiments, reconfiguring the system comprises ordering data in the one or more second data structures by order value. In some embodiments, reconfiguring the system comprises physically disconnecting each fluidic connection associated with data in the one or more second data structures in reverse order of order value. In some embodiments, reconfiguring the system comprises removing data associated with the disconnected fluidic connections from the one or more first data structures. In some embodiments, reconfiguring the system comprises providing a new fluidic connection from the second plurality of proposed fluidic connections when data associated with the new fluidic connection is absent from the one or more first data structures. In certain embodiments, the new fluidic connection comprises a flexible conduit extending from a storage port of the fluid connector unit to a receiver port of the fluid connector unit. In some embodiments, reconfiguring the system comprises storing data associated with the new fluidic connection in the one or more first data structures. In certain embodiments, the associated data comprises an order value and at least one data value associated with a location of the storage port and/or the receiver port of the new fluidic connection.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 1A is, according to some embodiments, a schematic diagram of an exemplary fluidic system comprising a plurality of fluid outlets, a plurality of fluid inlets, and a fluid connector unit comprising a plurality of flexible conduits, a storage tower comprising a plurality of storage ports, and a receiver tower comprising a plurality of receiver ports;

FIG. 7B is, according to some embodiments, an angled view of an exemplary reaction module.

DETAILED DESCRIPTION

Figure 1B:
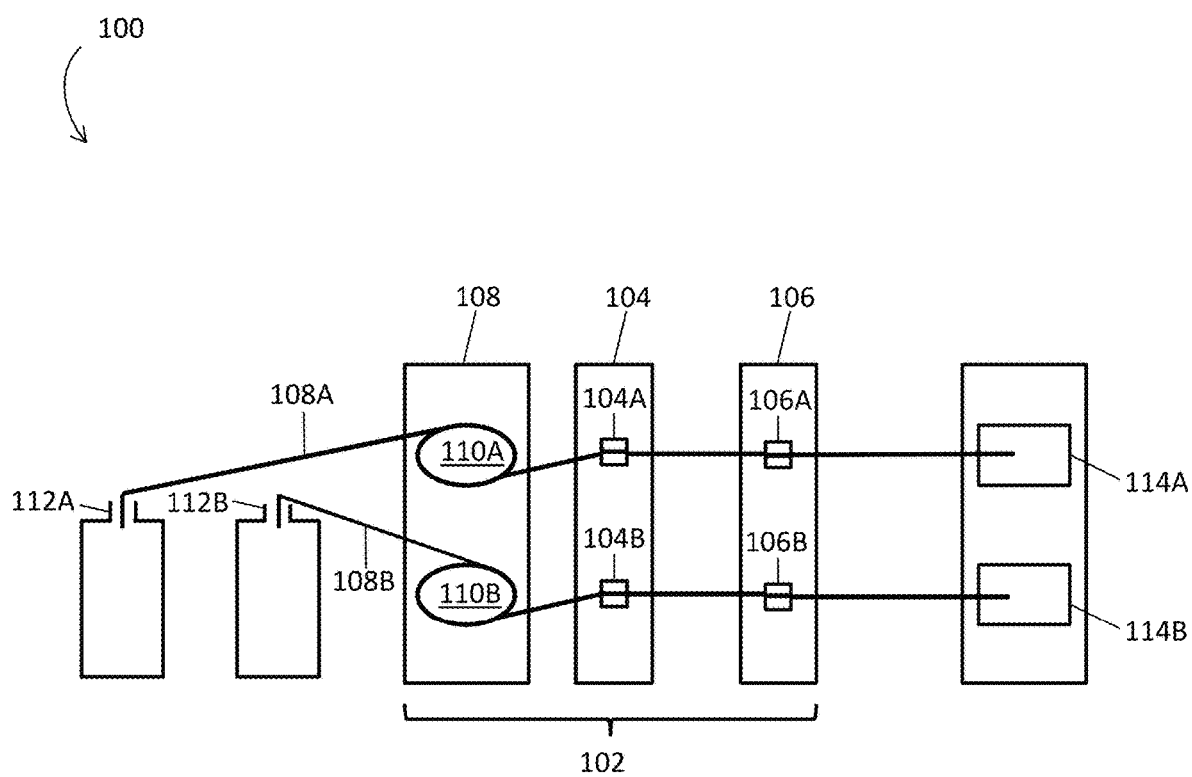
FIG. 1B is, according to some embodiments, a schematic diagram of the exemplary fluidic system of FIG. 1A, wherein a first fluidic connection has been provided between a first fluid outlet and a first fluid inlet, and wherein a second fluidic connection has been provided between a second fluid outlet and a second fluid inlet.

Aspects of the present disclosure relate to reconfigurable chemical synthesis systems and related components and methods. In some embodiments, the described systems comprise one or more fluidic connector units, wherein each fluidic connector unit comprises a plurality of flexible conduits. In certain cases, a system comprising one or more fluidic connector units is configured to synthesize a first chemical compound by providing a plurality of fluidic connections between a plurality of fluid outlets (e.g., outlets of chemical reagent sources, outlets of pumps) and a plurality of fluid inlets (e.g., inlets of reaction modules, inlets of pumps) through the plurality of flexible conduits. In certain cases, the system is subsequently reconfigured by resetting the system (e.g., disconnecting each fluidic connection) and/or configuring the system to synthesize a second, different chemical compound (e.g., disconnecting one or more fluidic connections and/or providing one or more additional fluidic connections). According to some embodiments, in order to avoid tangling the flexible conduits during reconfiguration of the system, the fluidic connections are disconnected according to certain inventive methods described herein. In certain embodiments, for example, fluidic connections are disconnected in reverse order relative to the order in which they were formed (e.g., the newest fluidic connection is disconnected first, the oldest fluidic connection is disconnected last). In certain other embodiments, certain fluidic connections are targeted for disconnection, and additional fluidic connections are disconnected if they overlap the targeted fluidic connections and were formed more recently than the targeted fluidic connections. The fluidic connection and/or disconnection steps may, in some embodiments, be performed by a robotic manipulator.

In some cases, the inventive systems and methods described herein allow for efficient, reliable synthesis of a wide array of chemical compounds, including pharmaceutical products. These systems and methods may provide significant advantages over conventional methods of synthesizing chemical compounds, which have typically relied on chemists conducting extensive experiments to develop complex synthesis schemes that often vary widely from compound to compound. These conventional synthesis schemes generally involve manual manipulation of flasks, vessels, and other pieces of laboratory equipment in order to obtain and purify a target chemical compound. As the inventors have recognized and appreciated, these conventional synthesis schemes are often costly and time-consuming.

In contrast to conventional systems and methods of synthesizing chemical compounds, the systems and methods described herein provide a flexible platform for efficiently, reliably synthesizing a wide variety of chemical compounds. Certain systems described herein comprise a plurality of sources of chemical reagents, a plurality of modules (e.g., reaction modules, mixing modules, purification modules), and one or more fluid connector units configured to provide fluidic connections between various system components. In certain embodiments, for example, each fluid connector unit comprises a plurality of flexible conduits, a storage tower comprising a plurality of storage ports, and a receiver tower comprising a plurality of receiver ports. In some embodiments, a first end of a flexible conduit, which is in fluid communication with a source of a chemical reagent, resides in a storage port of the storage tower. In some embodiments, one or more receiver ports of the receiver tower are in fluid communication with one or more modules (e.g., reaction modules). In certain cases, the first end of the flexible conduit is physically moved (e.g., by a robotic manipulator or a human) from the storage port to one of the receiver ports, thereby forming a fluidic connection between a source of a chemical reagent source and a module. In a similar manner, additional fluidic connections may be formed through the one or more fluid connector units to configure the system to synthesize the first chemical compound. According to some embodiments, the system may subsequently be reconfigured to synthesize a second, different chemical compound by changing one or more of the fluidic connections. In some cases, the system may be repeatedly reconfigured to synthesize a wide variety of chemical compounds by changing one or more fluidic connections of the one or more fluid connector units.

In some cases, the systems described herein advantageously reduce the number of expensive components, such as pumps and/or valves (e.g., actuated valves). In the absence of fluid connector units, a system would generally require additional pumps and/or valves to facilitate the synthesis of multiple chemical compounds. For example, if fluidic connections between chemical reagent sources, pumps, and/or modules were hard-wired in a system, the system would require one pump for each chemical reagent source. As the number of chemical compounds to be synthesized by the system—and, therefore, the number of required chemical reagents—increased, the associated costs would dramatically increase (and could potentially become prohibitively expensive). Alternatively, a system without fluid connector units may utilize a complex system of valves (e.g., actuated valves) to control fluid flow between pumps and chemical reagent sources. For example, each pump may be fluidically connected to multiple chemical reagent sources, and a system of valves may be used to direct the appropriate chemical reagents for a particular chemical compound to flow to the pumps and, subsequently, to the modules. Like the pumps, the complex system of valves may dramatically increase the costs associated with a chemical synthesis system.

In addition to reducing costs, certain embodiments described herein may advantageously facilitate the automation of certain chemical synthesis methods. For example, certain methods described herein prevent flexible conduits from becoming tangled during reconfiguration of a chemical synthesis system. In some cases, these methods permit a robotic manipulator to provide fluidic connections and disconnections in a system—for example, a robotic manipulator may physically move one end of a flexible conduit between a storage port and a receiver port of a fluid connector unit of a chemical synthesis system. In the absence of such methods, the robotic manipulator may be unable to provide the fluidic connections and disconnections because it could become tangled and could be rendered inoperative. In some cases, the ability of a robotic manipulator to provide fluidic connections and disconnections advantageously permits faster, less labor-intensive synthesis of chemical compounds.

FIG. 1A is a schematic diagram of exemplary fluidic system 100. In FIG. 1A, fluidic system 100 comprises fluid connector unit 102. In some embodiments, fluid connector unit 102 comprises storage tower 104, receiver tower 106, and flexible conduit tower 108. Storage tower 104 may, in some embodiments, comprise first storage port 104A and second storage port 104B. Receiver tower 106 may, in some embodiments, comprise first receiver port 106A and second receiver port 106B. Flexible conduit tower 108 may, in some embodiments, comprise first flexible conduit 108A, second flexible conduit 108B, first tensioner 110A, and second tensioner 110B. In certain cases, at least a portion of first flexible conduit 108A may be wound around first tensioner 110A, and at least a portion of second flexible conduit 108B may be wound around second tensioner 110B.

In some embodiments, a first end of first flexible conduit 108A resides in first storage port 104A. In some embodiments, first flexible conduit 108A is in fluid communication with first fluid outlet 112A. First fluid outlet 112A may, in certain cases, be an outlet of a source of a first chemical reagent or an outlet of a first pump. In some embodiments, a first end of second flexible conduit 108B resides in second storage port 104B. In some embodiments, second flexible conduit 108B is in fluid communication with second fluid outlet 112B. Second fluid outlet 112B may, in certain cases, be an outlet of a source of a second chemical reagent or an outlet of a second pump.

In certain embodiments, first receiver port 106A is in fluid communication with a fluid inlet (e.g., first fluid inlet 114A, second fluid inlet 114B). As a non-limiting, illustrative example, FIG. 1A shows first receiver port 106A in fluid communication with first fluid inlet 114A. In some cases, first fluid inlet 114A is a first inlet of a first module (e.g., a first reaction module, a first mixing module, a first purification module) or an inlet of a first pump. In certain embodiments, second receiver port 106B is in fluid communication with a fluid inlet (e.g., first fluid inlet 114A, second fluid inlet 114B). As a non-limiting, illustrative example, FIG. 1A shows first receiver port 106B in fluid communication with second fluid inlet 114B. In some cases, second fluid inlet 114B is a second inlet of the first module, a first inlet of a second module, or an inlet of a second pump.

Figure 1C:
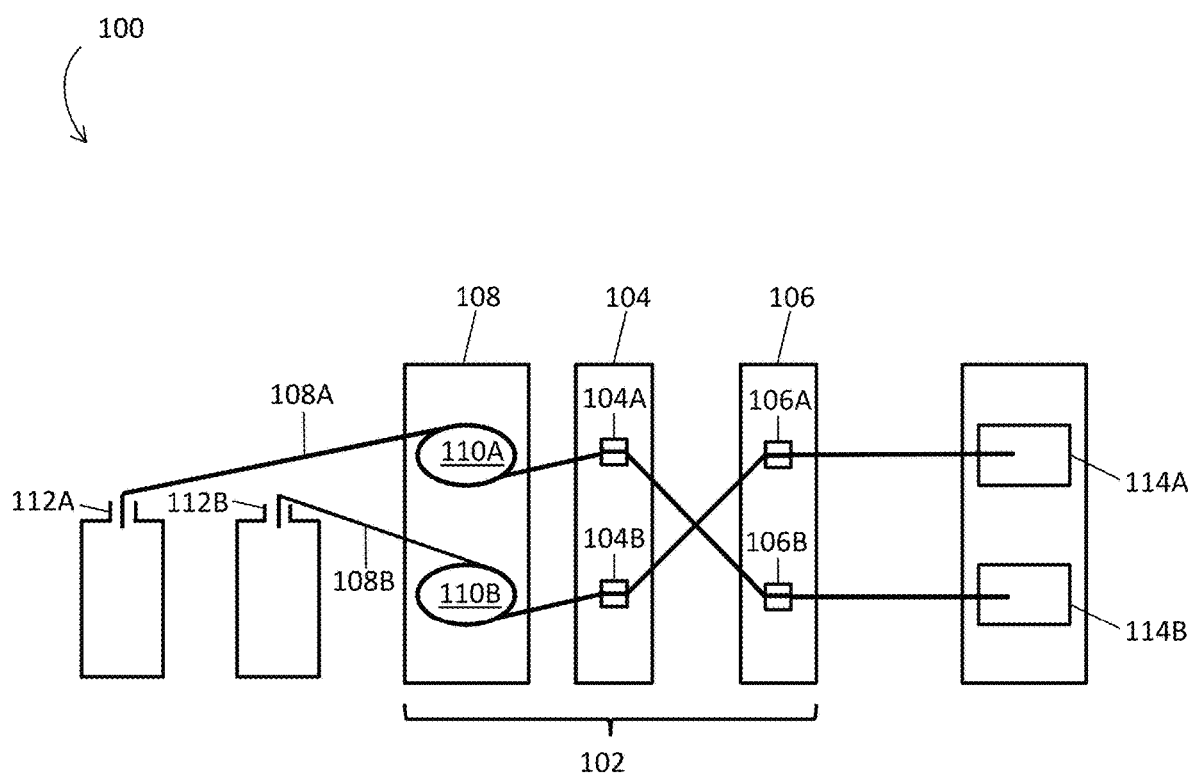
FIG. 1C is, according to some embodiments, a schematic diagram of the exemplary fluidic system of FIG. 1A, wherein a first fluidic connection has been provided between a first fluid outlet and a second fluid inlet, and wherein a second fluidic connection has been provided between a second fluid outlet and a first fluid inlet.

In operation, system 100 may be configured to synthesize a first chemical compound by forming a plurality of fluidic connections. For example, the first end of first flexible conduit 108A may be physically moved from first storage port 104A to one of the receiver ports (e.g., first receiver port 106A, second receiver port 106B). For example, FIG. 1B shows an illustrative embodiment in which the first end of first flexible conduit 108A has been physically moved from first storage port 104A to first receiver port 106A, thereby providing a first fluidic connection between first fluid outlet 112A and first fluid inlet 114A. As another example, FIG. 1C shows an illustrative embodiment in which the first end of first flexible conduit 108A has been physically moved from first storage port 104A to second receiver port 106B, thereby providing a first fluidic connection between first fluid outlet 112A and second fluid inlet 114B. In some embodiments, tension may be applied to first flexible conduit 108A through first tensioner 110A after providing the first fluidic connection.

In some embodiments, a second fluidic connection may be formed. For example, the first end of second flexible conduit 108B may be physically moved from second storage port 104B to one of the receiver ports (e.g., first receiver port 106A, second receiver port 106B). For example, FIG. 1B shows an illustrative embodiment in which the first end of second flexible conduit 108B has been physically moved from second storage port 104B to second receiver port 106B, thereby providing a second fluidic connection between second fluid outlet 112B and second fluid inlet 114B. As another example, FIG. 1C shows an illustrative embodiment in which the first end of second flexible conduit 108B has been physically moved from second storage port 104B to first receiver port 106A, thereby providing a second fluidic connection between second fluid outlet 112B and first fluid inlet 114A. In some embodiments, tension may be applied to second flexible conduit 108B through first tensioner 110B after providing the second fluidic connection.

In some embodiments, after system 100 has been configured to synthesize a first chemical compound, the first chemical compound may be synthesized. For example, in certain embodiments, a first chemical reagent may be directed to flow from first fluid outlet 112A to a fluid inlet (e.g., first fluid inlet 114A, second fluid inlet 114B). In the illustrative embodiment shown in FIG. 1B, the first chemical reagent may be directed to flow from first fluid outlet 112A to first fluid inlet 114A. In the illustrative embodiment shown in FIG. 1C, the first chemical reagent may be directed to flow from first fluid outlet 112A to second fluid inlet 114B. In certain embodiments, a second chemical reagent may be directed to flow from second fluid outlet 112B to a fluid inlet (e.g., first fluid inlet 114A, second fluid inlet 114B). For example, in the illustrative embodiment shown in FIG. 1B, the second chemical reagent may be directed to flow from second fluid outlet 112B to second fluid inlet 114B. In the illustrative embodiment shown in FIG. 1C, the second chemical reagent may be directed to flow from second fluid outlet 112B to first fluid inlet 114A. In some embodiments, first fluid inlet 114A and/or second fluid inlet 114B may be in fluid communication with one or more modules (e.g., reaction modules, mixing modules, purification modules). According to some embodiments, therefore, the first chemical reagent and/or second chemical reagent are directed to flow to one or more modules configured to produce the first chemical compound as a product.

In some embodiments, after the first chemical compound is synthesized, system 100 may be reconfigured by resetting the system (e.g., disconnecting each fluidic connection) and/or reconfiguring the system to synthesize a second chemical compound (e.g., disconnecting one or more fluidic connections and/or providing one or more additional fluidic connections). According to certain embodiments, fluidic connections in system 100 are disconnected so as to avoid tangling first flexible conduit 108A and second flexible conduit 108B. For example, in the illustrative embodiment shown in FIG. 1C, the second fluidic connection formed by moving the first end of second flexible conduit 108B from second storage port 104B to first receiver port 106A overlaps the first fluidic connection formed by moving the first end of first flexible conduit 108A from first storage port 104A to second receiver port 106B, and the second fluidic connection was formed after the first fluidic connection. Accordingly, in order to avoid tangling first flexible conduit 108A and second flexible conduit 108B, the second fluidic connection is disconnected (e.g., by moving the first end of second flexible conduit 108B from first receiver port 106A to second storage port 104B) prior to the first fluidic connection being disconnected (e.g., by moving the first end of first flexible conduit 108A from second receiver port 106B to first storage port 104A). In certain embodiments, system 100 may subsequently be reconfigured to synthesize a second chemical compound by providing one or more additional fluidic connections (e.g., moving the first end of first flexible conduit 108A from first storage port 104A to first receiver port 106A or second receiver port 106B and/or moving the first end of second flexible conduit 108A from second storage port 104B to first receiver port 106A or second receiver port 106B).

Figure 1D:
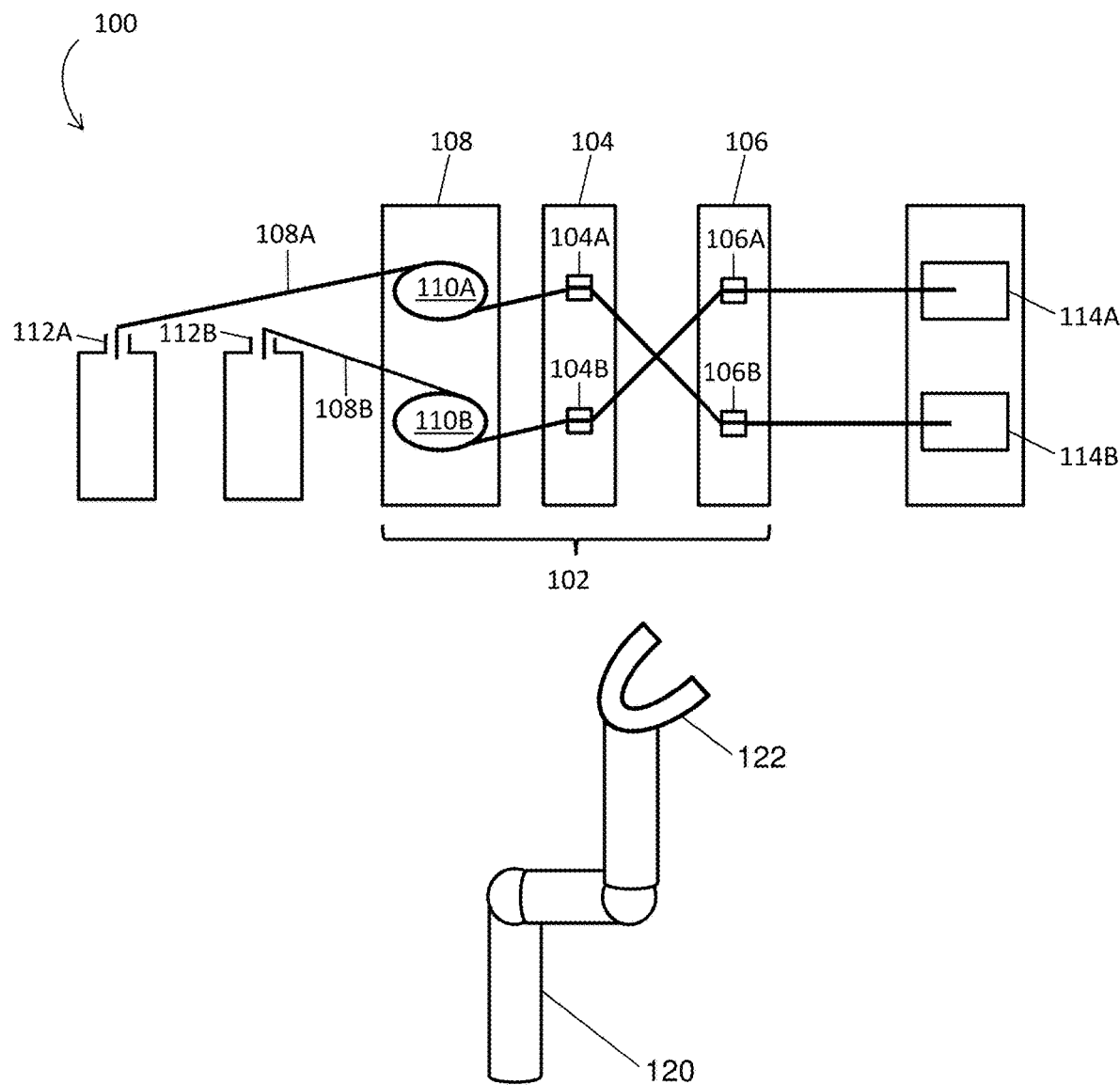
FIG. 1D is, according to some embodiments, a schematic diagram of the exemplary fluidic system of FIG. 1A, further comprising a robotic manipulator.

In certain embodiments, the steps of physically moving the first end of first flexible conduit 108A (e.g., between first storage port 104A and one of the receiver ports) and/or physically moving the first end of second flexible conduit 108B (e.g., between second storage port 104B and one of the receiver ports) may be performed by a robotic manipulator. As shown in FIG. 1D, system 100 may comprise robotic manipulator 120. In certain embodiments, robotic manipulator 120 comprises end effector 122. According to some embodiments, end effector 122 of robotic manipulator 120 is configured to grip at least a portion of the first end of first flexible conduit 108A and/or the first end of second flexible conduit 108B. In certain embodiments, end effector 122 of robotic manipulator 120 grips the first end of first flexible conduit 108A, physically moves the first end of first flexible conduit 108A from first storage port 104A to first receiver port 106A or second receiver port 106B, and then releases the first end of first flexible conduit 108A. In certain embodiments, end effector 122 of robotic manipulator 120 grips the first end of second flexible conduit 108B, physically moves the first end of second flexible conduit 108B from second storage port 104B to first receiver port 106A or second receiver port 106B, and then releases the first end of second flexible conduit 108B.

Figure 2A:
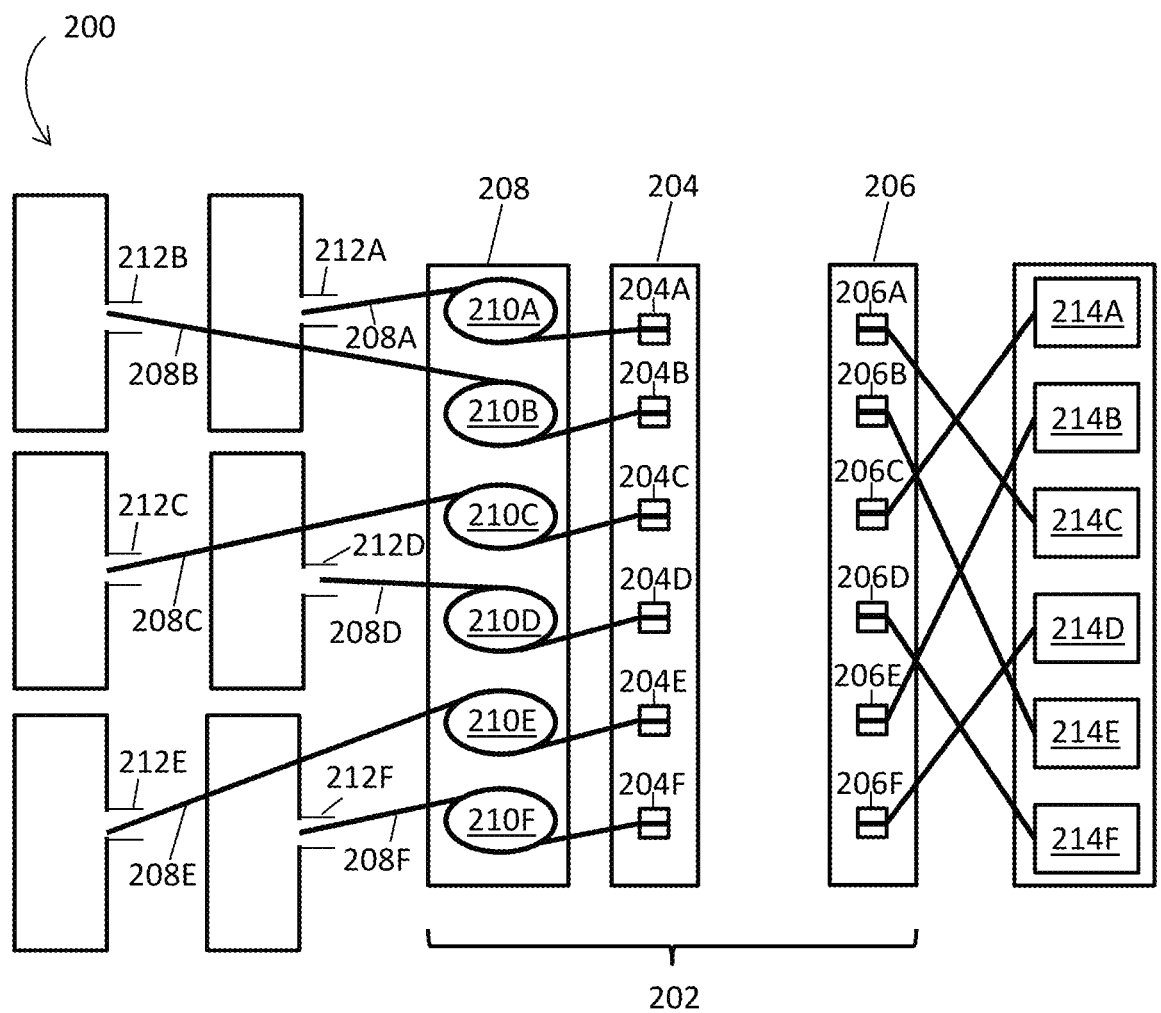
FIG. 2A is a schematic diagram of an exemplary fluidic system comprising six fluid outlets, six fluid inlets, and a fluid connector unit comprising six flexible conduits, a storage tower comprising six storage ports, and a receiver tower comprising six receiver ports, according to some embodiments.

Although exemplary system 100 shown in FIGS. 1A-1D comprises 2 fluid outlets, 2 fluid inlets, and fluid connector unit 102 comprising 2 flexible conduits, 2 tensioners, 2 storage ports, and 2 receiver ports, fluidic systems described herein may comprise any number of fluid outlets and fluid inlets, and fluid connector units described herein may comprise any number of flexible conduits, tensioners, storage ports, and receiver ports. As an illustrative example, FIG. 2A shows system 200, which comprises 6 fluid outlets 212A-F, 6 fluid inlets 214A-F, and fluid connector 202 comprising 6 flexible conduits 208A-F, 6 tensioners 210A-F, 6 storage ports 204A-F, and 6 receiver ports 206A-F. It should be noted that FIG. 2A shows a non-limiting, illustrative example of a system, and although FIG. 2A shows system 200 comprising the same number of fluid outlets, fluid inlets, flexible conduits, tensioners, storage ports, and receiver ports, the number of any system component may be the same or different from the number of any other system component. In particular, the number of storage ports in a system may be the same or different from the number of receiver ports in the system. The number of fluid outlets in a system may be the same or different from the number of flexible conduits in the system. The number of fluid inlets in a system may be the same or different from the number of receiver ports in the system. The number of fluid outlets in a system may be the same or different from the number of fluid inlets in the system. In addition, although FIG. 2A shows system 200 with certain connections between flexible conduits 208A-F and fluid outlets 212A-F, these connections are purely illustrative, and system 200 may comprise the same or different connections between flexible conduits 208A-F and fluid outlets 212A-F than those shown in FIG. 2A. Similarly, although FIG. 2A shows system 200 with certain connections between receiver ports 206A-F and fluid inlets 214A-F, these connections are purely illustrative, and system 200 may comprise the same or different connections between receiver ports 206A-F and fluid inlets 214A-F than those shown in FIG. 2A.

Figure 2B:
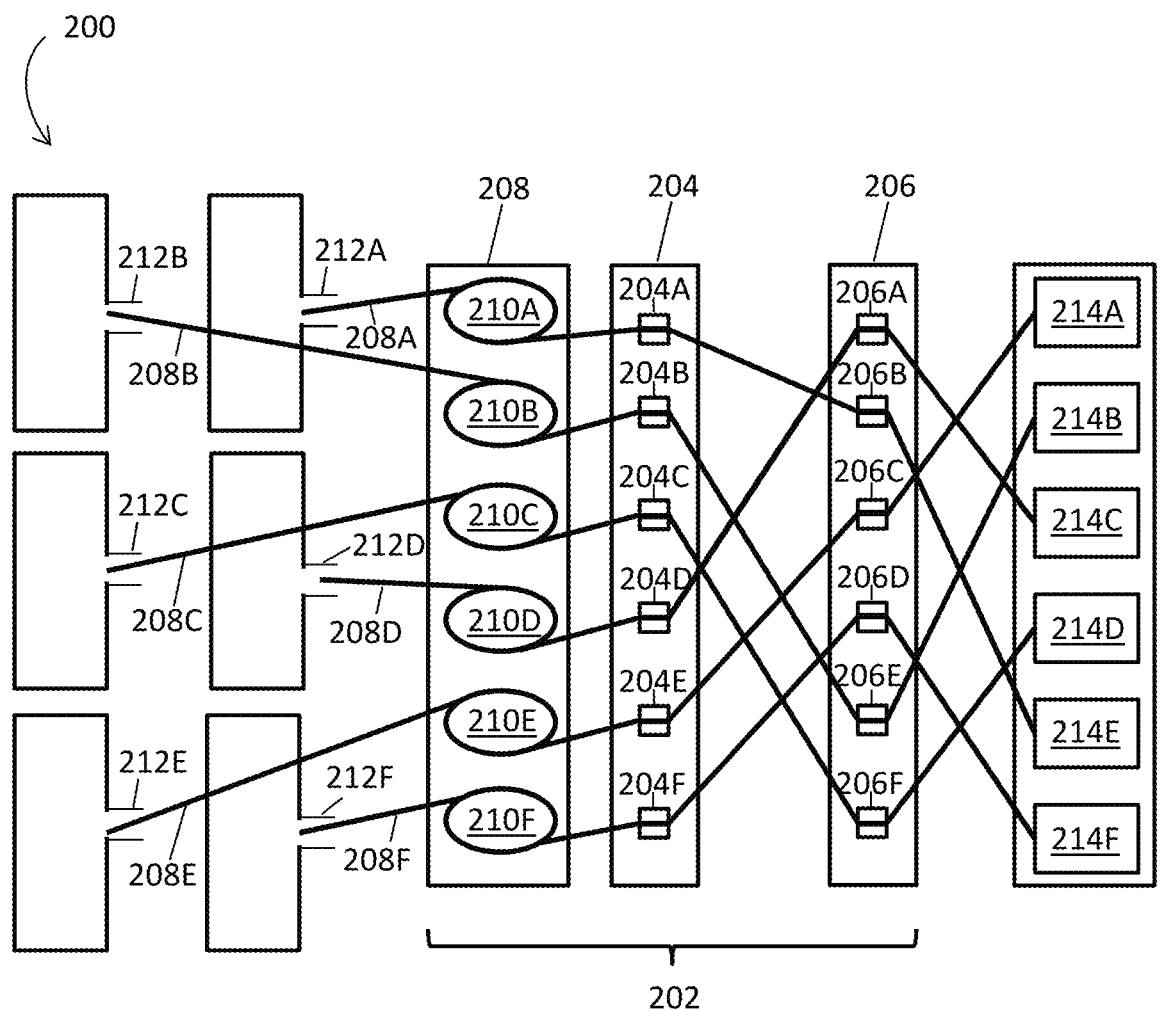
FIG. 2B is a schematic diagram of the exemplary fluidic system of FIG. 2A, wherein a plurality of fluidic connections have been provided between the six fluid outlets and the six fluid inlets through the fluid connector unit, according to some embodiments.

In operation, system 200 may be configured to synthesize a first chemical compound by forming a plurality of fluidic connections. For example, FIG. 2B shows an illustrative example in which a first end of first flexible conduit 208A has been physically moved from first storage port 204A to second receiver port 206B, thereby forming a first fluidic connection between first fluid outlet 212A and fifth fluid inlet 214E; a first end of second flexible conduit 208B has been physically moved from second storage port 204B to fifth receiver port 206E, thereby forming a second fluidic connection between second fluid outlet 212B and second fluid inlet 214B; a first end of third flexible conduit 208C has been physically moved from third storage port 204C to sixth receiver port 206F, thereby forming a third fluidic connection between third fluid outlet 212C and fourth fluid inlet 214D; a first end of fourth flexible conduit 208D has been physically moved from fourth storage port 204D to first receiver port 206A, thereby forming a fourth fluidic connection between fourth fluid outlet 212D and third fluid inlet 214C; a first end of fifth flexible conduit 208E has been physically moved from fifth storage port 204E to third receiver port 206C, thereby forming a fifth fluidic connection between fifth fluid outlet 212E and first fluid inlet 214A; and a first end of sixth flexible conduit 208F has been physically moved from sixth storage port 204F to fourth receiver port 206D, thereby forming a sixth fluidic connection between sixth fluid outlet 212F and sixth fluid inlet 214F. In some embodiments, tension may be applied to each of flexible conduits 208A-F through tensioners 210A-F after the fluidic connections have been formed. It should be noted that the fluidic connections shown in FIG. 2B are non-limiting, illustrative examples, and fluidic connections may be formed between any of fluid outlets 212A-F and fluid inlets 214A-F of system 200. For example, the first end of first flexible conduit 208A may be physically moved to any of receiver ports 206A-F. Similarly, any of flexible conduits 208A-F may be physically moved to any of receiver ports 206A-F. According to certain embodiments described herein, any appropriate fluidic connections for synthesizing the first chemical compound should be formed.

In certain embodiments, after the first chemical compound is synthesized, system 200 may be reconfigured by resetting the system (e.g., disconnecting each fluidic connection). In some cases, in order to avoid tangling flexible conduits 208A-F, the fluidic connections may be disconnected in the reverse order relative to the order in which they were formed. For example, in the illustrative example shown in FIG. 2B, the first end of sixth flexible conduit 208F may be moved from fourth receiver port 206D to sixth storage port 204F; the first end of fifth flexible conduit 208E may be moved from third receiver port 206C to fifth storage port 204E; the first end of fourth flexible conduit 208D may be moved from first receiver port 206A to fourth storage port 204D; the first end of third flexible conduit 208C may be moved from sixth receiver port 206F to third storage port 204C; the first end of second flexible conduit 208B may be moved from fifth receiver port 206E to second storage port 204B; and the first end of first flexible conduit 208D may be moved from second receiver port 206B to first storage port 204A.

In some embodiments, after the first chemical compound is synthesized, system 200 may be reconfigured by configuring the system to synthesize a second chemical compound. In certain embodiments, certain fluidic connections associated with the first chemical compound may be identified as being incompatible with the fluidic connections associated with the second chemical compound, and these incompatible fluidic connections may be targeted for disconnection. In some embodiments, the targeted fluidic connections may be compared to other fluidic connections to determine if there are fluidic connections that overlap the targeted fluidic connections and were formed later than the targeted fluidic connections. In some embodiments, overlapping fluidic connections that were formed later than the targeted fluidic connections may themselves be targeted for disconnection.

As an illustrative example, in certain embodiments, synthesis of the second chemical compound may require changing the second, fourth, and fifth fluidic connections. In some embodiments, the fifth fluidic connection may be evaluated and compared to the other fluidic connections, and it may be determined that the fifth fluidic connection overlaps the second and third fluidic connections, but since the fifth fluidic connection was formed after the second and third fluidic connections, the second and third fluidic connections do not need to be disconnected prior to disconnecting the fifth fluidic connection. In some embodiments, the fourth fluidic connection may be evaluated, and it may be determined that the fourth fluidic connection overlaps the first, second, and third fluidic connections, but since the fourth fluidic connection was formed after all three of those fluidic connections, the first, second, and third fluidic connections do not need to be disconnected prior to disconnecting the fourth fluidic connection. The second fluidic connection may then be evaluated, and it may be determined that the second fluidic connection overlaps the fourth, fifth, and sixth fluidic connections, and since all three were formed after the second fluidic connection, each of the fourth, fifth, and sixth connections needs to be disconnected prior to disconnecting the second fluidic connection. Since the sixth fluidic connection was not originally on the list of fluidic connections targeted for disconnection, the sixth fluidic connection may be added to the list of targeted fluidic connections and evaluated. Since it was the last fluidic connection formed, there are no overlapping fluidic connections that were formed after it was formed. Accordingly, based on these evaluations of the fluidic connections, the sixth fluidic connection would be disconnected first, the fifth fluidic connection would be disconnected second, the fourth fluidic connection would be disconnected third, and the second fluidic connection would be disconnected fourth. If necessary, appropriate fluidic connections for synthesizing the second chemical compound could then be formed.

Figure 3A:
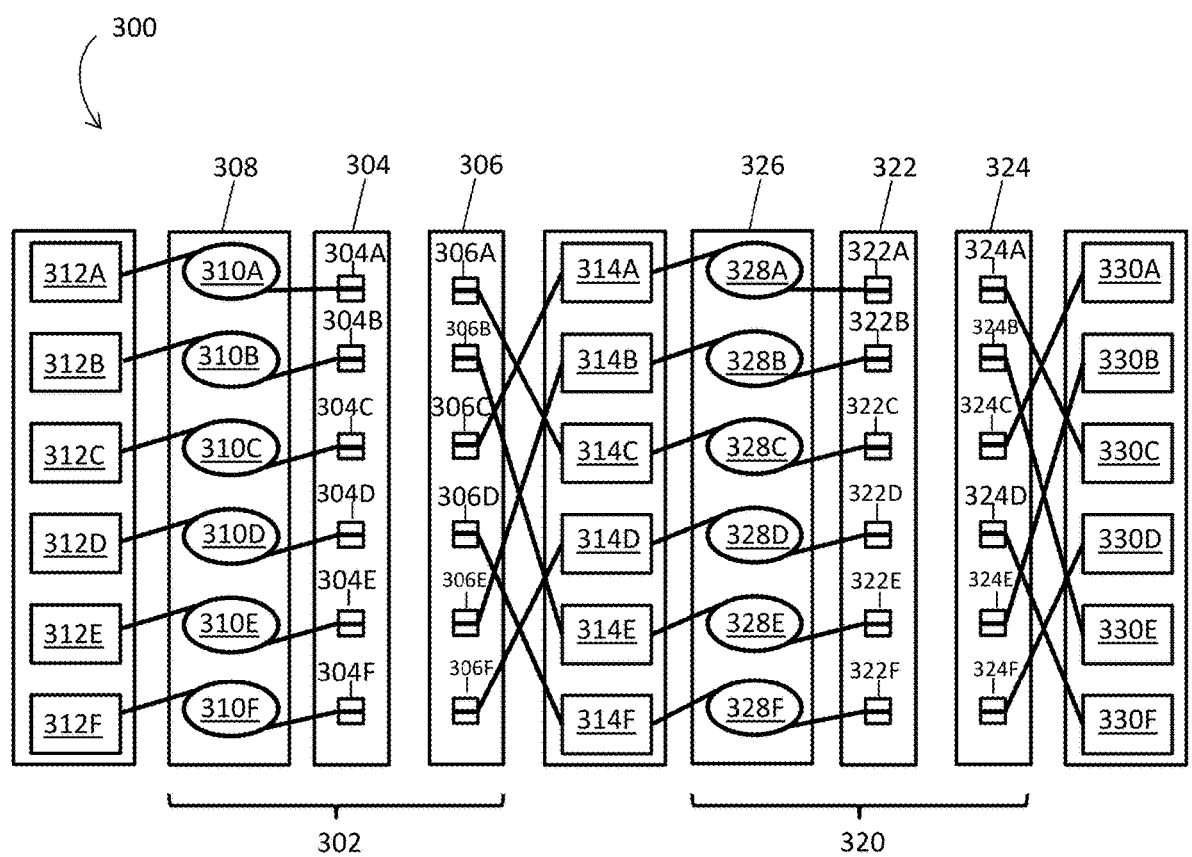
FIG. 3A is, according to some embodiments, a schematic diagram of an exemplary fluidic system comprising a plurality of chemical reagent sources, a plurality of pumps, a plurality of modules, and two fluid connector units, each fluid connector unit comprising a plurality of flexible conduits, a storage tower comprising a plurality of storage ports, and a receiver tower comprising a plurality of receiver ports.

In some embodiments, a system comprises two or more fluid connector units. For example, FIG. 3A is a schematic diagram of exemplary fluidic system 300 comprising first fluid connector unit 302 and second fluid connector unit 320. In some embodiments, first fluid connector unit 302 comprises first storage tower 304 comprising a first plurality of storage ports 304A-F, first receiver tower 306 comprising a first plurality of receiver ports 306A-F, and first flexible conduit tower 308 comprising a first plurality of flexible conduits 308A-F (not labeled in FIG. 3A) and a first plurality of tensioners 310A-F. In some embodiments, fluidic system 300 further comprises a first plurality of fluid outlets and a first plurality of fluid inlets. According to certain embodiments, one or more fluid outlets of the first plurality of fluid outlets are fluid outlets of chemical reagent sources 312A-F. In some embodiments, one or more fluid inlets of the first plurality of fluid inlets are fluid inlets of pumps 314A-F.

In some embodiments, at least a portion of each flexible conduit of the first plurality of flexible conduits 308A-F is wound around one of the tensioners of the first plurality of tensioners 310A-F. In some embodiments, each flexible conduit of the first plurality of flexible conduits 308A-F is in fluid communication with a fluid outlet of the first plurality of fluid outlets (i.e., fluid outlets of chemical reagent sources 312A-F). In some embodiments, a first end of each flexible conduit of the first plurality of flexible conduits 308A-F resides in a storage port of the first plurality of storage ports 304A-F. In certain embodiments, each receiver port of the first plurality of receiver ports 306A-F is in fluid communication with a fluid inlet of the first plurality of fluid inlets (i.e., fluid inlets of pumps 314A-F).

As shown in FIG. 3A, system 300 further comprises second fluid connector unit 320. In some embodiments, second fluid connector unit 320 comprises second storage tower 322 comprising a second plurality of storage ports 322A-F, second receiver tower 324 comprising a second plurality of receiver ports 324A-F, and second flexible conduit tower 326 comprising a second plurality of flexible conduits 326A-F (not labeled in FIG. 3A) and a second plurality of tensioners 328A-F. In some embodiments, fluidic system 300 further comprises a second plurality of fluid outlets and a second plurality of fluid inlets. According to certain embodiments, one or more fluid outlets of the second plurality of fluid outlets are fluid outlets of pumps 314A-F. In some embodiments, one or more fluid inlets of the second plurality of fluid inlets are fluid inlets of modules 330A-F.

Figure 3B:
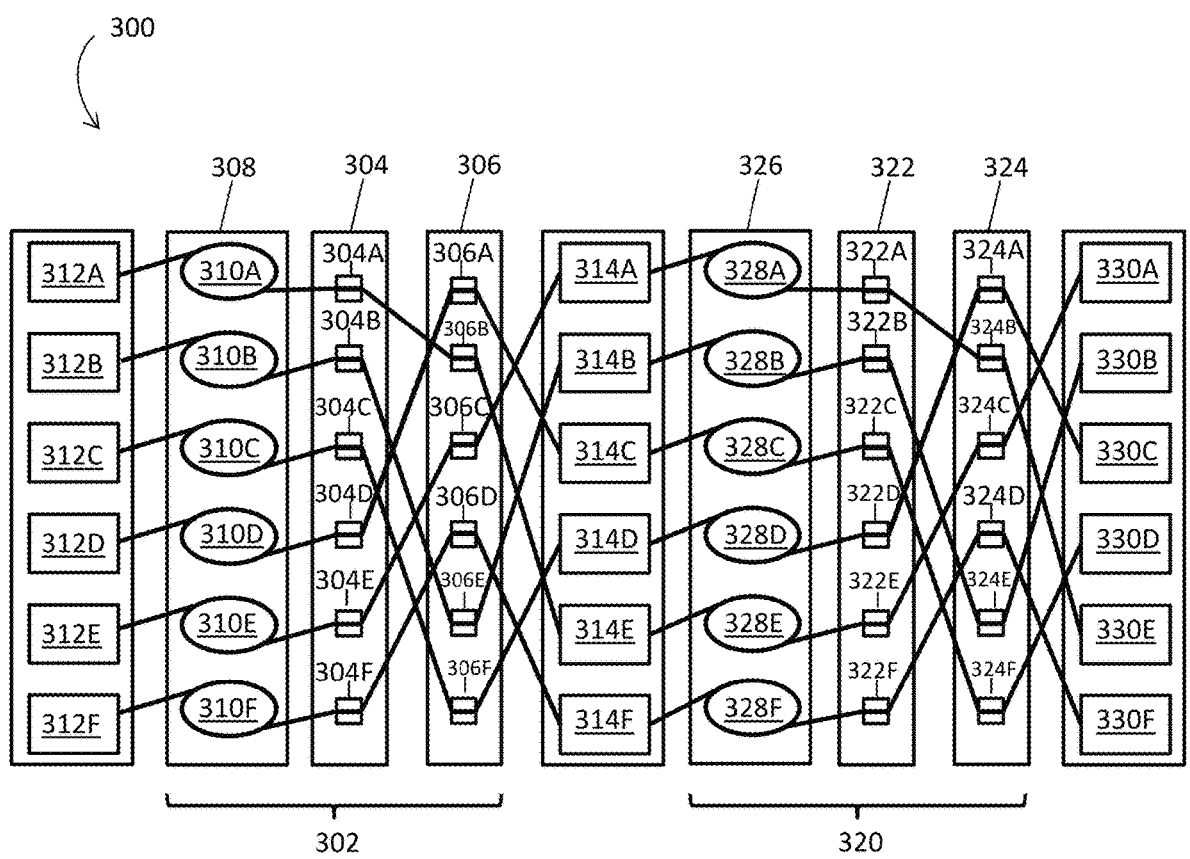
FIG. 3B is, according to some embodiments, a schematic diagram of the exemplary fluidic system of FIG. 3A, wherein a plurality of fluidic connections have been provided between the chemical reagent sources, pumps, and modules through the two fluid connector units, according to some embodiments.

In operation, system 300 may be configured to synthesize a first chemical compound by forming a first plurality of fluidic connections through first fluid connector 302 and a second plurality of fluidic connections through second fluid connector 320. According to some embodiments, for example, the first ends of one or more flexible conduits of the first plurality of flexible conduits 308A-F may be physically moved to one or more receiver ports of the first plurality of receiver ports 306A-F, thereby forming a fluidic connection between an outlet of one of chemical reagent sources 312A-F and an inlet of one of pumps 314A-F. According to some embodiments, the first ends of one or more flexible conduits of the second plurality of flexible conduits 326A-F may be physically moved to one or more receiver ports of the second plurality of receiver ports 324A-F, thereby forming a fluidic connection between an outlet of one of pumps 314A-F and an inlet of one of reaction modules 330A-F. In this manner, a plurality of fluidic connections between an outlet of a chemical reagent source and an inlet of a module (e.g., a reaction module) may be provided to facilitate the synthesis of the first chemical compound. In some embodiments, tension may be applied to flexible conduits 308A-F through tensioners 310A-F after providing a plurality of fluidic connections through first fluid connector unit 302. In some embodiments, tension may be applied to flexible conduits 326A-F through tensioners 328A-F after providing a plurality of fluidic connections through second fluid connector unit 320. FIG. 3B shows system 300 after a plurality of non-limiting, illustrative fluidic connections have been provided.

In certain embodiments, after the first chemical compound is synthesized, system 300 may be reconfigured by resetting the system. In some embodiments, each fluidic connection of first fluid connector unit 302 is disconnected and/or each fluidic connection of second fluidic connector unit 320 is disconnected. In embodiments in which each fluidic connection of first fluid connector unit 302 is disconnected, in order to avoid tangling flexible conduits 308A-F, the fluidic connections may be disconnected in the reverse order relative to the order in which they were formed (e.g., the sixth fluidic connection may be disconnected first, the first fluidic connection may be disconnected last). In embodiments in which each fluidic connection of second fluidic connector unit 320 is disconnected, in order to avoid tangling flexible conduits 326A-F, the fluidic connections may be disconnected in the reverse order relative to the order in which they were formed (e.g., the sixth fluidic connection may be disconnected first, the first fluidic connection may be disconnected last).

In some embodiments, after the first chemical compound is synthesized, system 300 may be reconfigured by configuring the system to synthesize a second chemical compound. In certain embodiments, certain fluidic connections associated with the first chemical compound may be identified as being incompatible with the fluidic connections associated with the second chemical compound, and these incompatible fluidic connections may be targeted for disconnection. In certain embodiments, fluidic connections from first fluid connector unit 302 may be targeted for disconnection and/or fluidic connections from second fluid connector unit 320 may be targeted for disconnection. In these embodiments, the targeted fluidic connections of a fluid connector unit may be compared to other fluidic connections of the fluid connector unit to determine if there are fluidic connections that overlap the targeted fluidic connections and were formed later than the targeted fluidic connections. In some embodiments, overlapping fluidic connections that were formed later than the targeted fluidic connections may themselves be targeted for disconnection.

As discussed above, certain systems described herein comprise one or more fluid connector units. In some embodiments, a system comprises at least one fluid connector unit, at least two fluid connector units, at least five fluid connector units, or at least ten fluid connector units. In some embodiments, a system comprises between one and two fluid connector units, between one and five fluid connector units, between one and ten fluid connector units, between two and five fluid connector units, or between two and ten fluid connector units. In certain embodiments, a system comprises one fluid connector unit, two fluid connector units, five fluid connector units, or ten fluid connector units.

In some embodiments, a fluid connector unit comprises a plurality of flexible conduits. In some embodiments, a fluid connector unit comprises at least 2, at least 5, at least 10, at least 15, at least 20, at least 25, at least 30, at least 40, at least 50, at least 75, at least 100, at least 150, at least 200, or at least 250 flexible conduits. In some embodiments, a fluid connector unit comprises between 2 and 10, between 2 and 20, between 2 and 30, between 2 and 40, between 2 and 50, between 2 and 75, between 2 and 100, between 2 and 150, between 2 and 200, between 2 and 250, between 10 and 20, between 10 and 30, between 10 and 40, between 10 and 50, between 10 and 75, between 10 and 100, between 10 and 150, between 10 and 200, between 10 and 250, between 20 and 50, between 20 and 75, between 20 and 100, between 20 and 150, between 20 and 200, between 20 and 250, between 50 and 75, between 50 and 100, between 50 and 150, between 50 and 200, between 50 and 250, between 75 and 100, between 75 and 150, between 75 and 200, between 75 and 250, between 100 and 150, between 100 and 200, between 100 and 250, between 150 and 200, between 150 and 250, or between 200 and 250 flexible conduits.

The flexible conduits of the plurality of flexible conduits may be formed of any suitable material. In certain embodiments, for example, one or more flexible conduits (or, in some cases, each flexible conduit) of the plurality of flexible conduits comprise a polymeric material. Non-limiting examples of suitable polymeric materials include perfluoroalkoxy (PFA), ethylene tetrafluoroethylene (ETFE), polyether ether ketone (PEEK), polyvinyl chloride (PVC), ethyl vinyl acetate (EVA), polyurethane, polyethylene, polypropylene, Teflon, nylon, and silicone. In certain embodiments, one or more flexible conduits (or, in some cases, each flexible conduit) of the plurality of flexible conduits comprise a metal and/or a metal alloy. Non-limiting examples of suitable metals and metal alloys include stainless steel, Hastelloy, and Inconel. In some embodiments, an external surface of one or more flexible conduits (or, in some cases, each flexible conduit) is substantially smooth. In certain cases, an external surface of one or more flexible conduits (or, in some cases, each flexible conduit), is substantially corrugated.

The flexible conduits of the plurality of flexible conduits may have any suitable size. In certain embodiments, for example, one or more flexible conduits (or, in some cases, each of the flexible conduits) of the plurality of flexible conduits have an internal diameter of about 40 mm or less, about 30 mm or less, about 20 mm or less, about 15 mm or less, about 10 mm or less, about 5 mm or less, about 2 mm or less, or about 1 mm or less. In some embodiments, one or more flexible conduits (or, in some cases, each of the flexible conduits) have an internal diameter of at least about 1 mm, at least about 2 mm, at least about 5 mm, at least about 10 mm, at least about 15 mm, at least about 20 mm, at least about 30 mm, or at least about 40 mm. In some embodiments, one or more flexible conduits (or, in some cases, each of the flexible conduits) have an internal diameter in the range of about 1 mm to about 5 mm, about 1 mm to about 10 mm, about 1 mm to about 20 mm, about 1 mm to about 30 mm, about 1 mm to about 40 mm, about 5 mm to about 10 mm, about 5 mm to about 20 mm, about 5 mm to about 30 mm, about 5 mm to about 40 mm, about 10 mm to about 20 mm, about 10 mm to about 30 mm, about 10 mm to about 40 mm, or about 20 mm to about 40 mm.

In certain embodiments, one or more flexible conduits (or, in some cases, each of the flexible conduits) of the plurality of flexible conduits have an external diameter of about 50 mm or less, about 40 mm or less, about 30 mm or less, about 20 mm or less, about 15 mm or less, about 10 mm or less, about 5 mm or less, about 2 mm or less, or about 1 mm or less. In some embodiments, one or more flexible conduits (or, in some cases, each of the flexible conduits) have an external diameter of at least about 1 mm, at least about 2 mm, at least about 5 mm, at least about 10 mm, at least about 15 mm, at least about 20 mm, at least about 30 mm, at least about 40 mm, or at least about 50 mm. In some embodiments, one or more flexible conduits (or, in some cases, each of the flexible conduits) have an external diameter in the range of about 1 mm to about 5 mm, about 1 mm to about 10 mm, about 1 mm to about 20 mm, about 1 mm to about 30 mm, about 1 mm to about 40 mm, about 1 mm to about 50 mm, about 5 mm to about 10 mm, about 5 mm to about 20 mm, about 5 mm to about 30 mm, about 5 mm to about 40 mm, about 5 mm to about 50 mm, about 10 mm to about 20 mm, about 10 mm to about 30 mm, about 10 mm to about 40 mm, about 10 mm to about 50 mm, about 20 mm to about 40 mm, about 20 mm to about 50 mm, or about 30 mm to about 50 mm.

In certain embodiments, one or more flexible conduits (or, in some cases, each of the flexible conduits) of the plurality of flexible conduits have a length of about 10 m or less, about 5 m or less, about 2 m or less, or about 1 m or less. In some embodiments, one or more flexible conduits (or, in some cases, each of the flexible conduits) of the plurality of flexible conduits have a length in the range of about 0 m to about 1 m, about 0 m to about 2 m, about 0 m to about 5 m, about 0 m to about 10 m, about 1 m to about 2 m, about 1 m to about 5 m, about 1 m to about 10 m, about 2 m to about 5 m, about 2 m to about 10 m, or about 5 m to about 10 m.

In some embodiments, one or more flexible conduits (or, in some cases, each flexible conduit) of the plurality of flexible conduits of a fluid connector unit comprise a first end comprising a fitting. In some cases, the fitting of a first end of a flexible conduit is configured to facilitate gripping and subsequent moving of the flexible conduit from a first location to a second location (e.g., by an end effector of a robotic manipulator, by a human). In certain cases, for example, a fitting having at least one dimension (e.g., a length, a width, a height, a diameter) greater than an external diameter of a flexible conduit may be easier for an end effector of a robotic manipulator and/or a human to grasp than the flexible conduit itself. Accordingly, in some embodiments, one or more flexible conduits (or, in some cases, each flexible conduit) of the plurality of flexible conduits of a fluid connector unit comprise a first end having a fitting having at least one dimension that is at least 2 times greater, at least 5 times greater, at least 10 times greater, at least 20 times greater, at least 50 times greater, at least 100 times greater, at least 150 times greater, at least 200 times greater, or at least 250 times greater than the external diameter of the flexible conduit. In some embodiments, the fitting of a first end of a flexible conduit has at least one dimension that is in the range of about 2 to 5 times greater, about 2 to 10 times greater, about 2 to 20 times greater, about 2 to 50 times greater, about 2 to 100 times greater, about 2 to 150 times greater, about 2 to 200 times greater, about 2 to 250 times greater, about 10 to 20 times greater, about 10 to 50 times greater, about 10 to 100 times greater, about 10 to 150 times greater, about 10 to 200 times greater, about 10 to 250 times greater, about 20 to 100 times greater, about 20 to 150 times greater, about 20 to 200 times greater, about 20 to 250 times greater, about 50 to 100 times greater, about 50 to 150 times greater, about 50 to 200 times greater, about 50 to 250 times greater, about 100 to 200 times greater, about 100 to 250 times greater, about 150 to 200 times greater, or about 150 to 250 times greater than the external diameter of the flexible conduit.

The fitting may be secured to a flexible conduit in any suitable manner. For example, in certain embodiments, the first end of the flexible conduit may be inserted into (and, in some cases, through) at least a portion of the fitting. In some cases, the fitting is reversibly secured to the flexible conduit. In some other cases, the fitting is permanently bonded to the flexible conduit.

The fitting may be formed of any suitable material. In some embodiments, the fitting comprises a metal. Non-limiting examples of suitable metals include stainless steel and aluminum. In some embodiments, the fitting comprises a polymeric material. Non-limiting examples of suitable polymeric materials include perfluoroalkoxy (PFA), ethylene tetrafluoroethylene (ETFE), polyether ether ketone (PEEK), polyvinyl chloride (PVC), ethyl vinyl acetate (EVA), polyurethane, polyethylene, polypropylene, Teflon, nylon, and silicone.

In some embodiments, the fitting comprises one or more sensors. In certain cases, the one or more sensors comprise one or more visual sensors and/or RFID sensors. In some instances, the one or more sensors are in electronic communication with a control system (e.g., a control system for tracking the location of flexible conduits).

In some embodiments, the fitting comprises one or more first mating components of a first coupling. In some embodiments, the first coupling facilitates a fluidic connection between the first end of the flexible conduit and another component of the fluid connector unit. For example, in certain cases, the first coupling facilitates a fluidic connection between the first end of the flexible conduit and a receiver port of the plurality of receiver ports (e.g., a receiver port in fluid communication with a fluid inlet). In some embodiments, the first coupling comprises a kinematic coupling, a quasi-kinematic coupling, a pin-in-hole coupling, a key coupling, and/or a preloaded coupling. In certain cases, for example, the one or more first mating components of the first coupling comprise one or more concave elements (e.g., grooves, holes, slots) and/or one or more convex elements (e.g., balls, pins, rods, cones, wedges). In some embodiments, the one or more first mating components of the first coupling comprise at least one, at least two, at least three, at least four, at least five, or at least six concave elements. In certain cases, the one or more first mating components of the first coupling comprise between one and three, between one and four, between one and five, between one and six, between two and three, between two and four, between two and five, between two and six, between three and four, between three and five, between three and six, between four and five, between four and six, or between five and six concave elements. In some embodiments, the one or more first mating components of the first coupling comprise at least one, at least two, at least three, at least four, at least five, or at least six convex elements. In certain cases, the one or more first mating components of the first coupling comprise between one and three, between one and four, between one and five, between one and six, between two and three, between two and four, between two and five, between two and six, between three and four, between three and five, between three and six, between four and five, between four and six, or between five and six convex elements. In some cases, the one or more first mating components of the first coupling are configured to mate with one or more second mating components of the first coupling on another system component. As an illustrative example, the one or more concave and/or convex elements of the fitting may be configured to mate with corresponding convex and/or concave elements on a receiver port.

In some embodiments, the first coupling is a preloaded coupling. A preloaded coupling generally refers to a coupling in which one or more first mating components associated with a first system component combine with one or more second mating components associated with a second system component to apply a preload force on an interface between the first system component and the second system component. In some cases, a preloaded coupling can advantageously facilitate precise alignment of two system components (e.g., a first end of a flexible conduit, a receiver port). In certain embodiments, the one or more first mating components of a first preloaded coupling comprise one or more magnetic components, electromagnetic components, springs, and/or pneumatic elements. In certain cases, the one or more first mating components of a first preloaded coupling comprise at least one, at least two, at least three, at least four, at least five, or at least six magnetic components, electromagnetic components, springs, and/or pneumatic elements. In certain cases, the one or more first mating components of the first coupling comprise between one and three, between one and four, between one and five, between one and six, between two and three, between two and four, between two and five, between two and six, between three and four, between three and five, between three and six, between four and five, between four and six, or between five and six magnetic components, electromagnetic components, springs, and/or pneumatic elements.

In some embodiments, each flexible conduit of the plurality of flexible conduits comprises the same one or more first mating components of a first coupling. In certain cases, each receiver port of the plurality of receiver ports comprises the same one or more second mating components of the first coupling. In this manner, each flexible conduit of the plurality of flexible conduits is capable of being fluidically connected to each receiver port of the plurality of receiver ports.

In some embodiments, a fluid connector unit comprises a plurality of tensioners. In some embodiments, the fluid connector unit comprises at least 2, at least 5, at least 10, at least 15, at least 20, at least 25, at least 30, at least 40, at least 50, at least 75, at least 100, at least 150, at least 200, or at least 250 tensioners. In some embodiments, the fluid connector unit comprises between 2 and 10, between 2 and 20, between 2 and 30, between 2 and 40, between 2 and 50, between 2 and 75, between 2 and 100, between 2 and 150, between 2 and 200, between 2 and 250, between 10 and 20, between 10 and 30, between 10 and 40, between 10 and 50, between 10 and 75, between 10 and 100, between 10 and 150, between 10 and 200, between 10 and 250, between 20 and 50, between 20 and 75, between 20 and 100, between 20 and 150, between 20 and 200, between 20 and 250, between 50 and 75, between 50 and 100, between 50 and 150, between 50 and 200, between 50 and 250, between 75 and 100, between 75 and 150, between 75 and 200, between 75 and 250, between 100 and 150, between 100 and 200, between 100 and 250, between 150 and 200, between 150 and 250, or between 200 and 250 tensioners.

In certain embodiments, the plurality of tensioners are arranged on one or more flexible conduit towers of the fluid connector unit. In some embodiments, the plurality of tensioners are arranged on a single flexible conduit tower of the fluid connector unit. In certain embodiments, the plurality of tensioners are arranged on two or more flexible conduit towers. In certain cases, each tensioner is arranged on a separate flexible conduit tower. The plurality of tensioners may be arranged in any suitable pattern (or may not be arranged in any pattern at all). For example, the plurality of tensioners may be substantially vertically arranged, substantially horizontally arranged, and/or arranged in a two-dimensional grid on the one or more flexible conduit towers.

As used herein, a tensioner refers to a device configured to apply tension to one or more flexible conduits. In certain embodiments, a tensioner comprises a reel (e.g., a reel configured to rotate about an axis, such as a vertical or horizontal axis). In certain embodiments, at least a portion of a flexible conduit is wound around the reel of the tensioner. In some cases, the tensioner may be driven by a motor (e.g., an electric motor).

In some embodiments, one or more tensioners of the plurality of tensioners comprise a fitting. The fitting may be configured to facilitate a fluidic connection between a flexible conduit of the fluid connector unit and another component of the system. For example, the fitting may be configured to provide a fluidic connection between a flexible conduit and a fluid outlet (e.g., an outlet of a chemical reagent source, an outlet of a pump). In certain embodiments, the fitting may comprise a ball bearing.

In some embodiments, first ends of one or more flexible conduits of a plurality of flexible conduits of a fluid connector unit reside in one or more storage ports of the fluid connector unit.

In some embodiments, each storage port comprises an opening through which a first end of a flexible conduit can pass. In certain embodiments, first ends of one or more flexible conduits (or, in some cases, each of the flexible conduits) are each inserted through a storage port, and a fitting is subsequently attached to each inserted end to prevent it from being withdrawn through the storage port.

In some embodiments, a fluid connector unit comprises a plurality of storage ports. In some embodiments, the fluid connector unit comprises at least 2, at least 5, at least 10, at least 15, at least 20, at least 25, at least 30, at least 40, at least 50, at least 75, at least 100, at least 150, at least 200, or at least 250 storage ports. In some embodiments, the fluid connector unit comprises between 2 and 10, between 2 and 20, between 2 and 30, between 2 and 40, between 2 and 50, between 2 and 75, between 2 and 100, between 2 and 150, between 2 and 200, between 2 and 250, between 10 and 20, between 10 and 30, between 10 and 40, between 10 and 50, between 10 and 75, between 10 and 100, between 10 and 150, between 10 and 200, between 10 and 250, between 20 and 50, between 20 and 75, between 20 and 100, between 20 and 150, between 20 and 200, between 20 and 250, between 50 and 75, between 50 and 100, between 50 and 150, between 50 and 200, between 50 and 250, between 75 and 100, between 75 and 150, between 75 and 200, between 75 and 250, between 100 and 150, between 100 and 200, between 100 and 250, between 150 and 200, between 150 and 250, or between 200 and 250 storage ports.

In certain embodiments, the plurality of storage ports are arranged on one or more storage towers of the fluid connector unit. In some embodiments, the plurality of storage ports are arranged on a single storage tower of the fluid connector unit. In certain embodiments, the plurality of storage ports are arranged on two or more storage towers. In certain cases, each storage port is arranged on a separate storage tower. The plurality of storage ports may be arranged in any suitable pattern (or may not be arranged in any pattern at all). For example, the plurality of storage ports may be substantially vertically arranged, substantially horizontally arranged, and/or arranged in a two-dimensional grid on the one or more storage towers.

In certain embodiments, a fluid connector unit comprises a plurality of receiver ports. In some embodiments, the fluid connector unit comprises at least 2, at least 5, at least 10, at least 15, at least 20, at least 25, at least 30, at least 40, at least 50, at least 75, at least 100, at least 150, at least 200, or at least 250 receiver ports. In some embodiments, the fluid connector comprises between 2 and 10, between 2 and 20, between 2 and 30, between 2 and 40, between 2 and 50, between 2 and 75, between 2 and 100, between 2 and 150, between 2 and 200, between 2 and 250, between 10 and 20, between 10 and 30, between 10 and 40, between 10 and 50, between 10 and 75, between 10 and 100, between 10 and 150, between 10 and 200, between 10 and 250, between 20 and 50, between 20 and 75, between 20 and 100, between 20 and 150, between 20 and 200, between 20 and 250, between 50 and 75, between 50 and 100, between 50 and 150, between 50 and 200, between 50 and 250, between 75 and 100, between 75 and 150, between 75 and 200, between 75 and 250, between 100 and 150, between 100 and 200, between 100 and 250, between 150 and 200, between 150 and 250, or between 200 and 250 receiver ports.

In certain embodiments, the plurality of receiver ports are arranged on one or more receiver towers of the fluid connector unit. In some embodiments, the plurality of receiver ports are arranged on a single receiver tower of the fluid connector unit. In certain embodiments, the plurality of receiver ports are arranged on two or more receiver towers. In certain cases, each receiver port is arranged on a separate receiver tower. The plurality of receiver ports may be arranged in any suitable pattern (or may not be arranged in any pattern at all). For example, the plurality of receiver ports may be substantially vertically arranged, substantially horizontally arranged, and/or arranged in a two-dimensional grid on the one or more receiver towers.

In some embodiments, one or more receiver ports of the plurality of receiver ports are in fluid communication with one or more fluid inlets. In certain embodiments, the one or more fluid inlets are inlets of pumps. In certain embodiments, the one or more fluid inlets are inlets of modules (e.g., reaction modules, mixing modules, purification modules).

In some embodiments, one or more receiver ports (or, in some cases, each receiver port) of the plurality of receiver ports comprise one or more second mating components of a first coupling. As discussed above, the first coupling may facilitate a fluidic connection between a first end of a flexible conduit and a receiver port. In some embodiments, the first coupling comprises a kinematic coupling, a quasi-kinematic coupling, a pin-in-hole coupling, a key coupling, and/or a preloaded coupling. In certain cases, for example, the one or more second mating components of the first coupling comprise one or more concave elements (e.g., grooves, holes, slots) and/or one or more convex elements (e.g., balls, pins, rods, cones, wedges). In some embodiments, the one or more second mating components of the first coupling comprise at least one, at least two, at least three, at least four, at least five, or at least six concave elements. In certain cases, the one or more second mating components of the first coupling comprise between one and three, between one and four, between one and five, between one and six, between two and three, between two and four, between two and five, between two and six, between three and four, between three and five, between three and six, between four and five, between four and six, or between five and six concave elements. In some embodiments, the one or more second mating components of the first coupling comprise at least one, at least two, at least three, at least four, at least five, or at least six convex elements. In certain cases, the one or more second mating components of the first coupling comprise between one and three, between one and four, between one and five, between one and six, between two and three, between two and four, between two and five, between two and six, between three and four, between three and five, between three and six, between four and five, between four and six, or between five and six convex elements. In some cases, the one or more second mating components of the first coupling are configured to mate with one or more first mating components of the first coupling. As an illustrative example, the one or more concave and/or convex elements of the receiver port may be configured to mate with corresponding convex and/or concave elements on a fitting of a first end of a flexible conduit.

In certain embodiments, the one or more second mating components of the first coupling comprise one or more second mating components of a first preloaded coupling. In some embodiments, the one or more second mating components of a first preloaded coupling comprise one or more magnetic components, electromagnetic components, springs, and/or pneumatic elements. In certain cases, the one or more second mating components of a first preloaded coupling comprise at least one, at least two, at least three, at least four, at least five, or at least six magnetic components, electromagnetic components, springs, and/or pneumatic elements. In certain cases, the one or more second mating components of the first preloaded coupling comprise between one and three, between one and four, between one and five, between one and six, between two and three, between two and four, between two and five, between two and six, between three and four, between three and five, between three and six, between four and five, between four and six, or between five and six magnetic components, electromagnetic components, springs, and/or pneumatic elements.

In some embodiments, the system comprises a plurality of fluid outlets. According to some embodiments, one or more fluid outlets of the plurality of fluid outlets comprise outlets of sources of chemical reagents and/or outlets of pumps.

In some embodiments, the system comprises a plurality of sources of chemical reagents. The chemical reagents may be any chemical reagents suitable for synthesis of a chemical compound. Generally, a variety of suitable chemical reagents can be used in the systems and methods described herein. The particular chemical reagents employed in a system or method will generally depend on the chemical compound to be synthesized.

In some embodiments, the system comprises a plurality of pumps. The pumps may be any suitable liquid flow pumps. In certain embodiments, one or more pumps (or, in some cases, each pump) of the plurality of pumps comprise positive displacement pumps. Non-limiting examples of suitable positive displacement pumps including rotary, reciprocating, and peristaltic pumps. In some embodiments, one or more pumps (or, in some cases, each pump) of the plurality of pumps have a maximum working pressure of at least about 50 psi, at least about 100 psi, at least about 150 psi, at least about 200 psi, at least about 300 psi, at least about 400 psi, at least about 500 psi, at least about 600 psi, at least about 700 psi, at least about 800 psi, at least about 850 psi, at least about 900 psi, at least about 1,000 psi, at least about 1,500 psi, at least about 2,000 psi, at least about 2,500 psi, at least about 3,000 psi, at least about 3,500 psi, at least about 4,000 psi, at least about 4,500 psi, at least about 5,000 psi, at least about 5,500 psi, or at least about 6,000 psi. In some embodiments, one or more pumps (or, in some cases, each pump) of the plurality of pumps have a maximum working pressure in the range of about 50 psi to about 100 psi, about 50 psi to about 150 psi, about 50 psi to about 200 psi, about 50 psi to about 300 psi, about 50 psi to about 400 psi, about 50 psi to about 500 psi, about 50 psi to about 600 psi, about 50 psi to about 700 psi, about 50 psi to about 800 psi, about 50 psi to about 900 psi, about 50 psi to about 1,000 psi, about 50 psi to about 1,500 psi, about 50 psi to about 2,000 psi, about 50 psi to about 2,500 psi, about 50 psi to about 3,000 psi, about 50 psi to about 3,500 psi, about 50 psi to about 4,000 psi, about 50 psi to about 4,500 psi, about 50 psi to about 5,000 psi, about 50 psi to about 5,500 psi, about 50 psi to about 6,000 psi, about 100 psi to about 200 psi, about 100 psi to about 300 psi, about 100 psi to about 400 psi, about 100 psi to about 500 psi, about 100 psi to about 600 psi, about 100 psi to about 700 psi, about 100 psi to about 800 psi, about 100 psi to about 900 psi, about 100 psi to about 1,000 psi, about 100 psi to about 1,500 psi, about 100 psi to about 2,000 psi, about 100 psi to about 2,500 psi, about 100 psi to about 3,000 psi, about 100 psi to about 3,500 psi, about 100 psi to about 4,000 psi, about 100 psi to about 4,500 psi, about 100 psi to about 5,000 psi, about 100 psi to about 5,500 psi, about 100 psi to about 6,000 psi, about 200 psi to about 500 psi, about 200 psi to about 600 psi, about 200 psi to about 700 psi, about 200 psi to about 800 psi, about 200 psi to about 900 psi, about 200 psi to about 1,000 psi, about 200 psi to about 1,500 psi, about 200 psi to about 2,000 psi, about 200 psi to about 2,500 psi, about 200 psi to about 3,000 psi, about 200 psi to about 3,500 psi, about 200 psi to about 4,000 psi, about 200 psi to about 4,500 psi, about 200 psi to about 5,000 psi, about 200 psi to about 5,500 psi, about 200 psi to about 6,000 psi, about 500 psi to about 1,000 psi, about 500 psi to about 1,500 psi, about 500 psi to about 2,000 psi, about 500 psi to about 2,500 psi, about 500 psi to about 3,000 psi, about 500 psi to about 3,500 psi, about 500 psi to about 4,000 psi, about 500 psi to about 4,500 psi, about 500 psi to about 5,000 psi, about 500 psi to about 5,500 psi, about 500 psi to about 6,000 psi, about 1,000 psi to about 2,000 psi, about 1,000 psi to about 2,500 psi, about 1,000 psi to about 3,000 psi, about 1,000 psi to about 3,500 psi, about 1,000 psi to about 4,000 psi, about 1,000 psi to about 4,500 psi, about 1,000 psi to about 5,000 psi, about 1,000 psi to about 5,500 psi, about 1,000 psi to about 6,000 psi, about 2,000 psi to about 3,000 psi, about 2,000 psi to about 4,000 psi, about 2,000 psi to about 5,000 psi, about 2,000 psi to about 6,000 psi, about 3,000 psi to about 6,000 psi, about 4,000 psi to about 6,000 psi, or about 5,000 psi to about 6,000 psi. In some embodiments, one or more pumps (or, in some cases, each pump) of the plurality of pumps have a maximum flow rate of at least about 5 mL/min, at least about 10 mL/min, at least about 20 mL/min, at least about 50 mL/min, or at least about 100 mL/min. In some embodiments, one or more pumps (or, in some cases, each pump) of the plurality of pumps have a maximum flow rate in the range of about 5 mL/min to about 10 mL/min, about 5 mL/min to about 20 mL/min, about 5 mL/min to about 50 mL/min, about 5 mL/min to about 100 mL/min, about 10 mL/min to about 20 mL/min, about 10 mL/min to about 50 mL/min, about 10 mL/min to about 100 mL/min, about 20 mL/min to about 50 mL/min, about 20 mL/min to about 100 mL/min, or about 50 mL/min to about 100 mL/min.

In some embodiments, one or more pumps (or, in some cases, each pump) of the plurality of pumps are directly fluidically connected to a component of a first fluid connector unit and/or a second fluid connector unit. In certain embodiments, one or more pumps (or, in some cases, each pump) of the plurality of pumps comprises a fluid inlet in fluid communication with a source of a chemical reagent. In certain embodiments, one or more pumps (or, in some cases, each pump) of the plurality of pumps comprises a fluid outlet in fluid communication with a module (e.g., a reaction module).

In some embodiments, the system comprises a reaction unit. The reaction unit may, according to some embodiments, comprise a plurality of module bays, wherein each module bay is configured to receive a module (e.g., a reaction module). In some embodiments, the reaction unit comprises at least 2, at least 5, at least 10, at least 15, at least 20, at least 25, at least 30, at least 40, at least 50, at least 75, at least 100, at least 150, at least 200, or at least 250 module bays. In some embodiments, the reaction unit comprises between 2 and 10, between 2 and 20, between 2 and 30, between 2 and 40, between 2 and 50, between 2 and 75, between 2 and 100, between 2 and 150, between 2 and 200, between 2 and 250, between 10 and 20, between 10 and 30, between 10 and 40, between 10 and 50, between 10 and 75, between 10 and 100, between 10 and 150, between 10 and 200, between 10 and 250, between 20 and 50, between 20 and 75, between 20 and 100, between 20 and 150, between 20 and 200, between 20 and 250, between 50 and 75, between 50 and 100, between 50 and 150, between 50 and 200, between 50 and 250, between 75 and 100, between 75 and 150, between 75 and 200, between 75 and 250, between 100 and 150, between 100 and 200, between 100 and 250, between 150 and 200, between 150 and 250, or between 200 and 250 module bays. In certain embodiments, the plurality of module bays are arranged within the reaction unit. The plurality of module bays may be arranged in any suitable pattern (or may not be arranged in any pattern at all). For example, the plurality of module bays may be substantially vertically arranged, substantially horizontally arranged, or arranged in a two-dimensional grid within the reaction unit.

In some embodiments, one or more module bays (or, in some cases, each module bay) of the plurality of module bays comprise one or more first mating components of a second coupling. In some embodiments, the second coupling facilitates a fluidic connection between a module bay and another component of the system. For example, in certain cases, the second coupling facilitates a fluidic connection between a module bay and a module (e.g., a reaction module). In some embodiments, the second coupling comprises a kinematic coupling, a quasi-kinematic coupling, a pin-in-hole coupling, a key coupling, and/or a preloaded coupling. In certain cases, for example, the one or more first mating components of the second coupling comprise one or more concave elements (e.g., grooves, holes, slots) and/or one or more convex elements (e.g., balls, pins, rods, cones, wedges). In some embodiments, the one or more first mating components of the second coupling comprise at least one, at least two, at least three, at least four, at least five, or at least six concave elements. In certain cases, the one or more first mating components of the second coupling comprise between one and three, between one and four, between one and five, between one and six, between two and three, between two and four, between two and five, between two and six, between three and four, between three and five, between three and six, between four and five, between four and six, or between five and six concave elements. In some embodiments, the one or more first mating components of the second coupling comprise at least one, at least two, at least three, at least four, at least five, or at least six convex elements. In certain cases, the one or more first mating components of the second coupling comprise between one and three, between one and four, between one and five, between one and six, between two and three, between two and four, between two and five, between two and six, between three and four, between three and five, between three and six, between four and five, between four and six, or between five and six convex elements. In some cases, the one or more first mating components of the second coupling are configured to mate with one or more second mating components of the second coupling on another system component. As an illustrative example, the one or more concave and/or convex elements of the module bay may be configured to mate with corresponding convex and/or concave elements on a module.

In some embodiments, the second coupling is a preloaded coupling. In certain embodiments, the one or more first mating components of a second preloaded coupling comprise one or more magnetic components, electromagnetic components, springs, and/or pneumatic elements. In certain cases, the one or more first mating components of a second preloaded coupling comprise at least one, at least two, at least three, at least four, at least five, or at least six magnetic components, electromagnetic components, springs, and/or pneumatic elements. In certain cases, the one or more first mating components of the second preloaded coupling comprise between one and three, between one and four, between one and five, between one and six, between two and three, between two and four, between two and five, between two and six, between three and four, between three and five, between three and six, between four and five, between four and six, or between five and six magnetic components, electromagnetic components, springs, and/or pneumatic elements.

In some embodiments, each module bay of the plurality of module bays comprises the same one or more first mating components of a second coupling. In certain cases, each module of the plurality of modules comprises the same one or more second mating components of the second coupling. In this manner, each module of the plurality of modules is capable of being fluidically, interchangeably connected to each module bay of the plurality of module bays.

In some embodiments, one or more module bays (or, in some cases, each module bay) of the plurality of module bays comprise a clamp (e.g., an actuated clamp). In certain cases, the clamp is configured to apply compressive force to a module. In some embodiments, one or more module bays (or, in some cases, each module bay) of the plurality of module bays further comprise one or more valves. The one or more valves may be configured to control fluid flow in one or more modules.

In some embodiments, the reaction unit comprises a plurality of modules (e.g., reaction modules, mixing modules, purification modules). In certain embodiments, the reaction unit comprises at least 2, at least 5, at least 10, at least 15, at least 20, at least 25, at least 30, at least 40, at least 50, at least 75, at least 100, at least 150, at least 200, or at least 250 modules. In certain embodiments, the reaction unit comprises between 2 and 10, between 2 and 20, between 2 and 30, between 2 and 40, between 2 and 50, between 2 and 75, between 2 and 100, between 2 and 150, between 2 and 200, between 2 and 250, between 10 and 20, between 10 and 30, between 10 and 40, between 10 and 50, between 10 and 75, between 10 and 100, between 10 and 150, between 10 and 200, between 10 and 250, between 20 and 50, between 20 and 75, between 20 and 100, between 20 and 150, between 20 and 200, between 20 and 250, between 50 and 75, between 50 and 100, between 50 and 150, between 50 and 200, between 50 and 250, between 75 and 100, between 75 and 150, between 75 and 200, between 75 and 250, between 100 and 150, between 100 and 200, between 100 and 250, between 150 and 200, between 150 and 250, or between 200 and 250 modules.

In some embodiments, one or more modules (or, in some cases, each module) of the plurality of modules comprise one or more second mating components of a second coupling. As discussed above, the second coupling may facilitate a fluidic connection between a module bay and a module. In some embodiments, the second coupling comprises a kinematic coupling, a quasi-kinematic coupling, a pin-in-hole coupling, a key coupling, and/or a preloaded coupling. In certain cases, for example, the one or more second mating components of the second coupling comprise one or more concave elements (e.g., grooves, holes, slots) and/or one or more convex elements (e.g., balls, pins, rods, cones, wedges). In some embodiments, the one or more second mating components of the second coupling comprise at least one, at least two, at least three, at least four, at least five, or at least six concave elements. In certain cases, the one or more second mating components of the second coupling comprise between one and three, between one and four, between one and five, between one and six, between two and three, between two and four, between two and five, between two and six, between three and four, between three and five, between three and six, between four and five, between four and six, or between five and six concave elements. In some embodiments, the one or more second mating components of the second coupling comprise at least one, at least two, at least three, at least four, at least five, or at least six convex elements. In certain cases, the one or more second mating components of the second coupling comprise between one and three, between one and four, between one and five, between one and six, between two and three, between two and four, between two and five, between two and six, between three and four, between three and five, between three and six, between four and five, between four and six, or between five and six convex elements. In some cases, the one or more second mating components of the second coupling are configured to mate with one or more first mating components of the second coupling. As an illustrative example, the one or more concave and/or convex elements of the module may be configured to mate with corresponding convex and/or concave elements on a module bay.

In certain embodiments, the one or more second mating components of the second coupling comprise one or more second mating components of a second preloaded coupling. In some embodiments, the one or more second mating components of a second preloaded coupling comprise one or more magnetic components, electromagnetic components, springs, and/or pneumatic elements. In certain cases, the one or more second mating components of a second preloaded coupling comprise at least one, at least two, at least three, at least four, at least five, or at least six magnetic components, electromagnetic components, springs, and/or pneumatic elements. In certain cases, the one or more second mating components of the second preloaded coupling comprise between one and three, between one and four, between one and five, between one and six, between two and three, between two and four, between two and five, between two and six, between three and four, between three and five, between three and six, between four and five, between four and six, or between five and six magnetic components, electromagnetic components, springs, and/or pneumatic elements.

According to some embodiments, one or more modules of the plurality of modules may be coupled to one or more module bays of the plurality of module bays in different orders and arrangements for different chemical compounds. In this manner, a system may be configured and reconfigured to synthesize a wide array of chemical compounds and perform a wide array of chemical reactions.

In some embodiments, at least one module of the plurality of modules comprises a reaction module. According to certain embodiments, a reaction module comprises a volume (e.g., a volume within a channel such as a microfluidic channel, a volume within a coiled flexible conduit, a hollowed-out volume within an enclosure, etc.) in which a chemical reaction can occur. In some embodiments, the reaction module is configured to receive one or more fluid inlet streams comprising one or more chemical reagents. In some embodiments, the reaction module is configured to house a chemical reaction involving the one or more chemical reagents. In some embodiments, the reaction module is configured to produce an outlet stream comprising a target chemical compound (or an intermediate thereof).

In some embodiments, the reaction module comprises one or more fluid inlets and one or more fluid outlets. In this manner, the reaction module may receive one or more chemical reagents and/or one or more intermediates of a target chemical compound. In certain embodiments, the reaction module may comprise an active mixer configured to mix the one or more chemical reagents and/or one or more intermediates of the target chemical compound. In some embodiments, the reaction module may be configured to produce an intermediate of a target chemical compound or the target chemical compound itself. In some instances, one or more fluid outlet streams comprising the target chemical compound (or an intermediate thereof) are transported through the one or more fluid outlets.

The reaction module may comprise any type of reactor, including, but not limited to, a plug flow reactor, a packed bed reactor (e.g., a catalytic packed bed reactor), a continuously stirred tank reactor, or any other suitable reactor type. In some embodiments, the reaction module is packed with various materials such as glass or metal beads, sieves, and/or resins. In some embodiments, the reaction module comprises one or more flexible conduits. The one or more flexible conduits may, in some embodiments, be formed of a polymeric material. Non-limiting examples of suitable polymeric materials include perfluoroalkoxy (PFA), ethylene tetrafluoroethylene (ETFE), polyether ether ketone (PEEK), polyvinyl chloride (PVC), ethyl vinyl acetate (EVA), polyurethane, polyethylene, polypropylene, Teflon, nylon, and silicone. In some embodiments, the flexible conduit may be coiled and embedded in a rigid housing. The rigid housing may be formed of any suitable material, including but not limited to stainless steel, aluminum, and silicon carbide. The rigid housing may, in some cases, ensure heat conduction and/or high resistance to mechanical stresses under various operating temperatures and pressures.

The reaction module may, in some instances, comprise additional components. In certain embodiments, for example, the reaction module comprises an integrated circuit, a heating element, a pressure sensor, and/or a Bluetooth communication device. In some embodiments, the reaction module comprises one or more fail-close valves. The one or more fail-close valves may, in some instances, advantageously ensure that chemical reagents and/or products do not leak from the reaction module (e.g., during transport of the reaction module).

In some embodiments, at least one module of the plurality of modules comprises a mixing module. The mixing module may employ any suitable type of mixing. In some embodiments, the mixing module comprises a junction between two or more fluidically connected conduits. In certain embodiments, for example, the mixing module comprises a Y junction, a T junction, an arrow head, and/or a cross junction. In some embodiments, the mixing module may be heated (e.g., using a heat exchanger). In some embodiments, two or more fluid streams may be mixed using static mixers. In some embodiments, the mixing module comprises a stir bar, an impeller, or the like to facilitate mixing of a first inlet stream and a second inlet stream. In some embodiments, the mixing module comprises a micromixer and/or an embedded static macromixer. The mixing module may be formed from any suitable material, including, but not limited to, PEEK, PTFE, ETFE, stainless steel, and glass. In certain embodiments, the mixing module comprises a stainless steel tube packed with glass microbeads. In some embodiments, the glass microbeads have an average diameter of at least about 100 μm.

In some embodiments, at least one module of the plurality of modules comprises a purification module. In some embodiments, the purification module can be used to at least partially separate an intermediate of a target chemical compound and/or a target chemical compound from at least one other component (i.e., the "removed component"). In some embodiments, the removed component is a solvent, a reaction by-product, and/or an impurity. The purification module may be configured to remove at least a portion of at least one removed component from an input stream (in certain cases, without chemically reacting the removed component(s)) to produce a product stream that does not include the removed portion of the component. In some embodiments, the removed component can be retained within the purification module. For example, in some cases the purification module comprises an absorptive separator. In some embodiments, the removed component can be transported out of the purification module in a separate outlet stream. For example, in some embodiments, the purification module is configured such that a fluid stream comprising a target chemical compound entering the purification module will exit the purification module in a first outlet stream enriched in the target chemical product (or an intermediate), and the removed component will exit in a second outlet stream lean in the target chemical compound (or an intermediate).

In some embodiments, the weight ratio of the target chemical compound present in a first outlet stream of the purification module and the target chemical compound present in a second outlet stream of the purification module is at least about 2:1, at least about 3:1, at least about 5:1, at least about 10:1, at least about 50:1, at least about 100:1, or at least about 1000:1. In certain embodiments, the second outlet stream of the purification module comprises substantially none of the target chemical compound.

The purification module may employ any purification method known in the art. In some embodiments, the purification module comprises a membrane. In certain cases, the membrane comprises chemically resistant polymeric materials. Non-limiting examples of suitable polymeric materials include polyethylene, high density polyethylene (HDPE), PFA, ETFE, polytetrafluoroethylene (PTFE), and ultra high molecular weight polyethylene (UHMWPE). In some embodiments, the purification module comprises a rigid housing. Non-limiting examples of suitable materials for the rigid housing include stainless steel, aluminum, and silicon carbide.

In some embodiments, the purification module comprises a liquid-liquid separator. The liquid-liquid separator can be configured to receive a mixture of a first liquid and a second liquid and produce a first outlet stream enriched in the first liquid relative to the mixture and a second outlet stream enriched in the second liquid relative to the mixture. In some embodiments, the liquid-liquid separator comprises a membrane. In some embodiments, the liquid-liquid separator is a liquid-liquid gravity separator (e.g., a sedimentation liquid-liquid separator). In some embodiments, the purification module comprises a settling tank and/or a continuous centrifuge.

In some embodiments the purification module is a membrane-based purification module. In certain instances, the purification module comprises a semipermeable membrane (i.e., the membrane permits passage of one or more fluids but excludes passage of a second fluid). In the case of certain membrane-based purification modules, separation can be achieved by relying on the surface tension forces between the membrane, the first fluid in a mixture, and the second fluid in the mixture, as described, for example, in U.S. Patent Publication No. 2007/0144967 to Guenther et al. entitled "Fluid Separation" and U.S. Patent Publication No. 2009/0282978 to Jensen et al. entitled "Microfluidic Separators for Multiphase Fluid-Flow Based On Membranes", each of which is incorporated herein by reference in its entirety for all purposes. Separators are also described, for example, in International Patent Publication No. WO 2016/025803, published on Feb. 18, 2016, filed on Aug. 14, 2015 as International Application No. PCT/US2015/045220, and entitled "Systems and Methods for Synthesizing Chemical Products, Including Active Pharmaceutical Ingredients," which is incorporated herein by reference in its entirety for all purposes. In some embodiments, the purification module comprises a reverse osmosis separator. In some embodiments, the purification module comprises a diaphragm. In some embodiments, the diaphragm comprises a chemically resistant polymeric material (e.g., polyethylene, HDPE, PFA, ETFE, PTFE). In some cases, the purification module comprises a self-tuning pressure regulator.

In some embodiments, the purification module comprises a retention column. The retention column can be figured to retain (e.g., by adsorbing, absorbing, or otherwise taking up) at least one component of an inlet stream transported into the purification module. In some embodiments, the retention column is a drying column. In some embodiments, the retention column comprises an adsorption medium. Non-limiting examples of suitable adsorption media include carbon-based material, such as charcoal. Other adsorption media are also possible, and those of ordinary skill in the art would be able to select a suitable adsorption medium based on the component desired to be removed from the inlet stream.

As discussed above, certain of the systems described herein are configured to perform a multi-step chemical synthesis. In some embodiments, the multi-step chemical synthesis comprises transporting one or more fluid inlet streams comprising one or more chemical reagents into a first module. In certain cases, the first module is a reaction module. In some embodiments, the one or more chemical reagents are reacted, within the reaction module, to produce an intermediate of a target chemical compound within a first reaction module outlet stream. In certain embodiments, the first reaction module outlet stream is transported to a second module of the system. In some instances, the second module is a second reaction module. In certain embodiments, the first reaction module outlet stream and/or one or more fluid inlet streams comprising one or more chemical reagents may be transported into the second reaction module. In some embodiments, the intermediate of the target chemical compound is reacted with the one or more chemical reagents to produce the target chemical compound (or an intermediate thereof) within a second reaction module outlet stream. In certain embodiments, the second reaction module outlet stream may be transported to a third reaction module for further reaction with one or more chemical reagents. In certain embodiments, the second reaction module outlet stream may be transported to a purification module to separate the target chemical compound from one or more components of the second reaction module outlet stream (e.g., a solvent, a reaction byproduct) to produce a purification module outlet stream having a higher concentration of the target chemical compound than the second reaction module outlet stream. In certain embodiments, the second reaction module outlet stream may exit the system as a product stream. Additional process steps can also be performed, according to certain embodiments.

In certain aspects, any systems described herein can be continuous systems, and any methods described herein can be continuous processes. One of ordinary skill in the art would understand the difference between a continuous process and a non-continuous process (e.g., a batch process). Continuous processes generally refer to processes in which one or more chemical reagents enter a system, one or more product streams exit the system, and the transformations the system is designed to achieve all occur during at least one overlapping period of time. As one example, in a continuous reaction module, one or more chemical reagents enter the reaction module and one or more reaction products exit the reaction module during at least a portion of the time that the chemical reaction within the reaction module is taking place. As another example, in a continuous mixing module, one or more inlet streams enter the mixing module and a mixed product stream exits the mixing module during at least a portion of the time that mixing within the mixing module is taking place. As yet another example, in a continuous purification module, an inlet stream enters the purification module and a purified product stream exits the purification module during at least a portion of the time that purification (e.g., separation) within the purification module is taking place.

Continuous systems that include two or more modules (e.g., reaction modules, mixing modules, purification modules, and the like) are generally arranged such that transport between the modules within the continuous system occurs during at least a portion of the time during which the modules are performing their intended function (e.g., reaction for a reaction module, mixing for a mixing module, purification for a purification module, etc.).

In some embodiments, a chemical product is produced continuously from one or more chemical reagents when the one or more chemical reagents are being transported into the continuous system and the chemical product is being transported out of the continuous system during at least portions of the times the components of the continuous system are being operated to produce the chemical product.

In certain embodiments, each module within the continuous system (e.g., reaction module, mixing module, purification module, etc.) is operated in a continuous fashion such that the products of each module are substantially continuously transported from one module to the other until the final chemical product is produced. In certain embodiments, at least some of the target chemical compound (e.g., at least 50 wt %, at least 75 wt %, at least 90 wt %, at least 95 wt %, or substantially all of the target chemical compound) produced by each upstream module within the continuous system is transported to the corresponding downstream module within the continuous system within a period of about 12 hours, about 6 hours, about 1 hour, about 30 minutes, about 10 minutes, about 1 minute, or about 10 seconds after it exits the upstream module.

In some embodiments, the system comprises a module storage unit. The module storage unit may, in some embodiments, provide storage for modules that are not being used for synthesis of a particular chemical compound. In some cases, the module storage unit comprises a plurality of module bays, wherein each module bay is configured to receive a module. In some embodiments, the module storage unit comprises at least 2, at least 5, at least 10, at least 15, at least 20, at least 25, at least 30, at least 40, at least 50, at least 75, at least 100, at least 150, at least 200, or at least 250 module bays. In some embodiments, the module storage unit comprises between 2 and 10, between 2 and 20, between 2 and 30, between 2 and 40, between 2 and 50, between 2 and 75, between 2 and 100, between 2 and 150, between 2 and 200, between 2 and 250, between 10 and 20, between 10 and 30, between 10 and 40, between 10 and 50, between 10 and 75, between 10 and 100, between 10 and 150, between 10 and 200, between 10 and 250, between 20 and 50, between 20 and 75, between 20 and 100, between 20 and 150, between 20 and 200, between 20 and 250, between 50 and 75, between 50 and 100, between 50 and 150, between 50 and 200, between 50 and 250, between 75 and 100, between 75 and 150, between 75 and 200, between 75 and 250, between 100 and 150, between 100 and 200, between 100 and 250, between 150 and 200, between 150 and 250, or between 200 and 250 module bays. In certain embodiments, the plurality of module bays are arranged within the module storage unit. The plurality of module bays may be arranged in any suitable pattern (or may not be arranged in any pattern at all). For example, the plurality of module bays may be substantially vertically arranged, substantially horizontally arranged, or arranged in a two-dimensional grid within the module storage unit.

In some cases, the module bays of the module storage unit may be substantially similar to the module bays of the reaction unit. In some embodiments, for example, one or more module bays (or, in some cases, each module bay) of the plurality of module bays comprise one or more first mating components of a second coupling. In some embodiments, the second coupling facilitates a fluidic connection between a module bay and a module. As described above with respect to the module bays of the reaction unit, one or more module bays (or, in some cases, each module bay) of the plurality of module bays of the module storage unit may comprise one or more first mating components of the second coupling. In some embodiments, one or more module bays (or, in some cases, each module bay) of the plurality of module bays comprise a clamp (e.g., an actuated clamp). In certain cases, the clamp is configured to apply compressive force to a module.

In some embodiments, the system comprises a robotic manipulator. In some embodiments, the robotic manipulator comprises an end effector. In certain cases, the end effector of the robotic manipulator is capable of manipulating one or more components of systems described herein. According to some embodiments, for example, the end effector of the robotic manipulator is configured to grip a module and/or at least a portion of a first end of a flexible conduit. In some embodiments, the end effector of the robotic manipulator is configured to apply compressive force to one or more components of systems described herein.

In some embodiments the robotic manipulator comprises one or more sensors. In certain embodiments, for example, the robotic manipulator comprises one or more visual sensors, RFID sensors, proximity sensors, and/or heat sensors.

In some embodiments, the robotic manipulator comprises one or more actuators. In certain cases, the robotic manipulator comprises at least 1 joint, at least 2 joints, at least 3 joints, at least 4 joints, at least 5 joints, at least 10 joints, or at least 15 joints. In certain embodiments, the robotic manipulator comprises between 1-3 joints, between 1-5 joints, between 1-10 joints, between 1-15 joints, between 2-5 joints, between 2-10 joints, between 2-15 joints, between 5-10 joints, between 5-15 joints, or between 10-15 joints.

According to some embodiments, the robotic manipulator may have at least at least 2 degrees of freedom, at least 3 degrees of freedom, at least 4 degrees of freedom, at least 5 degrees of freedom, or at least 6 degrees of freedom. In some embodiments, the robotic manipulator has between 2-3 degrees of freedom, between 2-4 degrees of freedom, between 2-5 degrees of freedom, between 2-6 degrees of freedom, between 3-5 degrees of freedom, between 3-6 degrees of freedom, and between 4-6 degrees of freedom.

In some embodiments, at least a portion of the robotic manipulator is stationary (e.g., attached to a stationary surface). In some embodiments, the robotic manipulator is mobile (e.g., mounted on one or more wheels or continuous tracks).

According to some embodiments, systems described herein are enclosed within an enclosure. In some embodiments, the enclosure is an air-tight enclosure. In some cases, an enclosed environment may advantageously permit systems described herein to perform chemical syntheses comprising air-sensitive reactions. In some embodiments, the enclosure may have a relatively small footprint and/or a relatively low height. In some cases, for example, the enclosure has a footprint of about 10 $m^2$ or less, about 5 $m^2$ or less, about 1 $m^2$ or less, or about 0.5 $m^2$ or less. In some embodiments, the enclosure has a footprint in the range of about 0.5 $m^2$ to about 1 $m^2$, about 0.5 $m^2$ to about 5 $m^2$, or about 0.5 $m^2$ to about 10 $m^2$. In some embodiments, the enclosure has a height of about 7 m or less, about 5 m or less, about 2 m or less, about 1 m or less, about 0.5 m or less, or about 0.1 m or less. In some embodiments, the enclosure has a height in the range of about 0.1 m to about 0.5 m, about 0.1 m to about 1 m, about 0.1 m to about 2 m, about 0.1 m to about 5 m, about 0.1 m to about 7 m, about 0.5 m to about 1 m, about 0.5 m to about 2 m, about 0.5 m to about 5 m, about 0.5 m to about 7 m, about 1 m to about 5 m, about 1 m to about 7 m, or about 5 m to about 7 m. In some embodiments, the enclosed system may be portable and may be easily transported on vehicles such as cars, trucks, trains, boats, and/or planes.

Certain embodiments relate to inventive methods. In some embodiments, the method comprises configuring a system to synthesize a first chemical compound. In some embodiments, configuring the system to synthesize the first chemical compound comprises providing a first plurality of fluidic connections in an ordered sequence. In some embodiments, one or more fluidic connections (or, in some cases, each fluidic connection) of the first plurality of fluidic connections comprise a flexible conduit extending from a storage port of a fluid connector unit to a receiver port of the fluid connector unit.

In some embodiments, the method comprises providing a first fluidic connection between a first fluid outlet and a first fluid inlet through a first flexible conduit. In some embodiments, providing the first fluidic connection comprises physically moving a first end of the first flexible conduit from a first storage port of a first fluid connector unit to any receiver port of the first fluid connector unit (referred to as the first receiver port regardless of its location on the one or more receiver towers) along a first path. In some embodiments, physically moving the first end of the first flexible conduit from the first storage port to the first receiver port comprises gripping at least a portion of the first end (e.g., a fitting attached to the first end) and moving the first end along a first path (e.g., a substantially straight path) from the first storage port to the first receiver port. In certain embodiments, first mating components on the first end of the first flexible conduit couple with second mating components on the first receiver port to directly fluidically connect the first end of the first flexible conduit and the first receiver port. In some embodiments, the first end of the first flexible conduit is subsequently released (e.g., released from a grip of an end effector of a robotic manipulator, released from a grip of a human).

In some embodiments, the first end of the first flexible conduit is in fluid communication with a first fluid outlet. The first fluid outlet may be any fluid outlet of any component of the systems described herein. For example, in certain non-limiting examples, the first fluid outlet is an outlet of a first pump or a source of a first chemical reagent. In some embodiments, the first fluid outlet is in fluid communication with a source of a first chemical reagent. In some embodiments, the first receiver port that receives the first end of the first flexible conduit is in fluid communication with a first fluid inlet. The first fluid inlet may be any fluid inlet of any component of the systems described herein. For example, in certain non-limiting examples, the first fluid inlet is an inlet of a first module (e.g., a reaction module) or a first pump. In some embodiments, the first fluid inlet is in fluid communication with a first module.

In some embodiments, the method further comprises applying tension to the first flexible conduit after providing the first fluidic connection. In some embodiments, the tension may be applied by a tensioner. In some embodiments, tension is applied such that a length of the first flexible conduit from the first storage port to the first receiver port is substantially similar to the shortest distance between the first storage port and the first receiver port. The shortest distance between the first storage port and the first receiver port may be calculated using any technique known in the art. In an illustrative embodiment, a location $(x_1, y_1, z_1)$ of the first storage port in three-dimensional Cartesian coordinates relative to a known point (e.g., a point acting as the origin) and a location $(x_2, y_2, z_2)$ of the first receiver port in three-dimensional Cartesian coordinates relative to the same point may be obtained, and the shortest distance d between the two locations may be calculated according to the following formula:

$$d=\sqrt{(x_2-x_1)^2+(y_2-y_1)^2+(z_2-z_1)^2}$$

In some embodiments, the difference between the length of the first flexible conduit from the first storage port to the first receiver port and the shortest distance between the first storage port and the first receiver port is about 5 mm or less, about 2 mm or less, about 1 mm or less, about 0.5 mm or less, about 0.2 mm or less, or about 0.1 mm or less. In some embodiments, the difference between the length of the first flexible conduit from the first storage port to the first receiver port and the shortest distance between the first storage port and the first receiver port is in the range of about 0.1 mm to about 0.5 mm, about 0.1 mm to about 1 mm, about 0.1 mm to about 2 mm, or about 0.1 mm to about 5 mm.

In some embodiments, the method further comprises providing a second fluidic connection between a second fluid outlet and a second fluid inlet through a second flexible conduit after providing the first fluidic connection. In some embodiments, providing the second fluidic connection comprises physically moving a first end of a second flexible conduit from a second storage port of the first fluid connector unit to any receiver port of the first fluid connector unit (referred to as the second receiver port regardless of its location on the one or more receiver towers) along a second path after physically moving the first end of the first flexible conduit along the first path.

For ease of reference, in this application, the horizontal direction (e.g., the direction from a storage tower to a receiver tower) is referred to as the x-direction, the vertical direction (e.g., the direction from a top end of the storage tower to a bottom end of the storage tower) is referred to as the y-direction, and the direction orthogonal to the horizontal and vertical directions is referred to as the z-direction. For example, referring to FIG. 1A, movement in a straight line from first storage port 104A to first receiver port 104B would be movement in the x-direction, movement in a straight line from first storage port 104A to second storage port 104B would be movement in the y-direction, and movement out of the page would be movement in the z-direction.

In some embodiments, physically moving the first end of the second flexible conduit from the second storage port to the second receiver port comprises gripping at least a portion of the first end (e.g., a fitting attached to the first end). In some embodiments, physically moving the first end of the second flexible conduit from the second storage port to the second receiver port further comprises moving the first end of the second flexible conduit a short distance (e.g., about 5 cm or less, about 2 cm or less, about 1 cm or less, about 0.5 cm or less, about 0.25 cm or less) in the x-direction (e.g., towards the second receiver port) to disconnect the first end from the second storage port. In certain embodiments, physically moving the first end of the second flexible conduit from the second storage port to the second receiver port further comprises moving the first end of the second flexible conduit a short distance (e.g., about 5 cm or less, about 2 cm or less, about 1 cm or less, about 0.5 cm or less, about 0.25 cm or less) in the z-direction (e.g., towards a robotic manipulator, towards a human). In some instances, moving the first end of the second flexible conduit a short distance in the z-direction ensures that the first end of the second flexible conduit can be physically moved from the second storage port to the second receiver port without intersecting existing fluidic connections. In some cases, the first end of the second flexible conduit is then moved along a second path (e.g., a substantially straight path) from the second storage port to the second receiver port. In this manner, the second fluidic connection may be formed in front of the first fluidic connection. In certain embodiments, first mating components on the first end of the second flexible conduit couple with second mating components on the second receiver port to directly fluidically connect the first end of the second flexible conduit and the second receiver port. In some embodiments, the first end of the second flexible conduit is subsequently released (e.g., released from a grip of an end effector of a robotic manipulator, released from a grip of a human).

In some embodiments, the first end of the second flexible conduit is in fluid communication with a second fluid outlet. The second fluid outlet may be any fluid outlet of any component of the systems described herein. For example, in certain non-limiting examples, the second fluid outlet is an outlet of a second pump or a source of a second reagent. In some embodiments, the second fluid outlet is in fluid communication with a source of a second reagent. In some embodiments, the second receiver port is in fluid communication with a second fluid inlet. The second fluid inlet may be any fluid inlet of any component of the systems described herein. For example, in certain non-limiting examples, the second fluid inlet is an inlet of a second pump, a second inlet of the first module, or a first inlet of a second module. In some embodiments, the second fluid inlet is in fluid communication with a second module.

In some embodiments, the method further comprises applying tension to the second flexible conduit after providing the second fluidic connection. In some embodiments, the tension may be applied by a tensioner. In some embodiments, tension is applied such that a length of the second flexible conduit from the second storage port to the second receiver port is substantially similar to the shortest distance between the second storage port and the second receiver port. In some embodiments, the difference between the length of the second flexible conduit from the second storage port to the second receiver port and the shortest distance between the second storage port and the second receiver port is about 5 mm or less, about 2 mm or less, about 1 mm or less, about 0.5 mm or less, about 0.2 mm or less, or about 0.1 mm or less. In some embodiments, the difference between the length of the second flexible conduit from the second storage port to the second receiver port and the shortest distance between the second storage port and the second receiver port is in the range of about 0.1 mm to about 0.5 mm, about 0.1 mm to about 1 mm, about 0.1 mm to about 2 mm, or about 0.1 mm to about 5 mm.

In some embodiments, the method further comprises providing additional fluidic connections between one or more fluid outlets and one or more fluid inlets. In some embodiments, each fluidic connection is provided by physically moving a first end of a flexible conduit of the plurality of flexible conduits of a fluid connector unit from a storage port of the plurality of storage ports of the fluid connector unit to a receiver port of the plurality of receiver ports of the fluid connector unit along a path (e.g., a substantially straight path). In some embodiments, a first end of the flexible conduit is in fluid communication with a fluid outlet. The fluid outlet may be any fluid outlet of any component of the systems described herein. For example, in certain non-limiting examples, the fluid outlet is an outlet of a pump or a source of a reagent. In some embodiments, the receiver port is in fluid communication with a fluid inlet. The fluid inlet may be any fluid inlet of any component of the systems described herein. For example, in certain non-limiting examples, the fluid inlet is an inlet of a pump or an inlet of a module. Any number of fluidic connections may be made between any fluid outlets and fluid inlets of the system. The appropriate fluidic connections will generally depend on the chemical compound to be synthesized.

In some embodiments, the method further comprises applying tension to a flexible conduit after providing a fluidic connection through the flexible conduit. In some embodiments, the tension may be applied by a tensioner. In some embodiments, the tensioner is driven by a motor (e.g., an electric motor). In some embodiments, tension is applied such that a length of the flexible conduit from a storage port to a receiver port is substantially similar to the shortest distance between the storage port and the receiver port. In some embodiments, the difference between the length of the flexible conduit from the storage port to the receiver port and the shortest distance between the storage port and the receiver port is about 5 mm or less, about 2 mm or less, about 1 mm or less, about 0.5 mm or less, about 0.2 mm or less, or about 0.1 mm or less. In some embodiments, the difference between the length of the flexible conduit from the storage port to the receiver port and the shortest distance between the storage port and the receiver port is in the range of about 0.1 mm to about 0.5 mm, about 0.1 mm to about 1 mm, about 0.1 mm to about 2 mm, or about 0.1 mm to about 5 mm.

In some embodiments, the method comprises synthesizing a first chemical compound. According to some embodiments, the method comprises flowing one or more chemical reagents through one or more fluidic connections to one or more modules. In certain embodiments, for example, the method comprises flowing a first reagent from a source of a first reagent to a module (e.g., a first module, a second module). In certain embodiments, the method comprises flowing a second reagent from the source of the second reagent to a module (e.g., a first module, a second module). In some embodiments, a first reaction module may receive one or more chemical reagents, and one or more chemical reactions may occur within the first reaction module. In some embodiments, an outlet stream comprising the first chemical compound or an intermediate thereof may be directed to flow from the first reaction module to a second module (e.g., a second reaction module, a mixing module, a purification module).

In some embodiments, the method further comprises reconfiguring the system after synthesizing the first chemical compound. In some embodiments, reconfiguring the system comprises resetting the system (e.g., undoing all the fluidic connections formed to synthesize the first chemical compound). In some embodiments, reconfiguring the system comprises configuring the system to synthesize a second, different chemical compound.

According to some embodiments, reconfiguring the system comprises disconnecting one or more fluidic connections. In some cases, the fluidic connections are disconnected in a particular sequence to avoid tangling the flexible conduits. For example, in some embodiments, newer fluidic connections may be formed in front of older fluidic connections. If a newer fluidic connection overlaps an older fluidic connection, an attempt to disconnect the older fluidic connection prior to disconnecting the newer fluidic connection may result in tangled flexible conduits.

In some embodiments, disconnecting one or more fluidic connections comprises disconnecting the fluidic connections in reverse order relative to the order in which they were formed. For example, in some embodiments, the method comprises disconnecting a second fluidic connection prior to disconnecting a first fluidic connection formed prior to the second fluidic connection. In certain embodiments, the method comprises physically moving the first end of the second flexible conduit from the second receiver port to the second storage port prior to physically moving the first end of the first flexible conduit from the first receiver port to the first storage port.

In certain embodiments, disconnecting one or more fluidic connections comprises determining whether a newer fluidic connection overlaps an older fluidic connection and, if so, disconnecting the newer fluidic connection prior to disconnecting the older fluidic connection.

In certain embodiments, determining whether a newer fluidic connection overlaps an older fluidic connection may be performed by storing data associated with each fluidic connection. According to certain embodiments, for example, the method comprises storing data associated with each fluidic connection of the first plurality of fluidic connections. The associated data may, in some embodiments, comprise an order value and at least one data value associated with a location of the storage port and/or the receiver port in one or more first data structures. In some cases, the order value can provide information on the order in which the fluidic connections were formed. As a non-limiting example, the order value of the first fluidic connection may be 1, the order value of the second fluidic connection may be 2, the order value of the third fluidic connection may be 3, etc. Any values may be used as the order values so long as they provide information on the order of the fluidic connections. In some cases, the at least one data value associated with a location of the storage port and/or the receiver port may comprise Cartesian coordinates (e.g., two-dimensional Cartesian coordinates, three-dimensional Cartesian coordinates), polar coordinates, spherical coordinates, and/or cylindrical coordinates of the storage port and/or the receiver port. In some embodiments, the at least one data value associated with a location of the storage port and/or the receiver port may comprise at least one joint angle of the robotic manipulator (e.g., the angle of at least one joint of the robotic manipulator when an end effector of the robotic manipulator is located at the storage port and/or the receiver port).

In some embodiments, the method further comprises calculating a first vector (e.g., a two-dimensional vector, a three-dimensional vector) between the first storage port and the first receiver port. In some embodiments, the method further comprises calculating a second vector (e.g., a two-dimensional vector, a three-dimensional vector) between the second storage port and the second receiver port. The method may, in some embodiments, further comprise determining whether the first vector overlaps the second vector. As a non-limiting, illustrative example, a first two-dimensional vector may be calculated from the x-y coordinates of the first storage port and the first receiver port (relative to a known point acting as the origin), a second two-dimensional vector may be calculated from the x-y coordinates of the second storage port and the second receiver port (relative to the same known point), and it may be determined whether the first vector overlaps the second vector based on whether the first vector intersects the second vector. In some embodiments, the method comprises disconnecting the second fluid connection prior to disconnecting the first fluid connection when: 1) the second vector overlaps the first vector; and 2) the second order value is higher than the first order value. In certain embodiments, disconnecting the second fluid connection prior to disconnecting the first fluid connection comprises physically moving the first end of the second flexible conduit from the second receiver port to the second storage port prior to physically moving the first end of the first flexible conduit from the first receiver port to the first storage port.

In some embodiments, determining whether a newer fluidic connection overlaps an older fluidic connection may be performed via sensing (e.g., visual sensing, RFID sensing). For example, in certain embodiments, a robotic manipulator may comprise a visual sensor to determine whether an overlapping fluidic connection is further or closer to the visual sensor. For example, if the overlapping fluidic connection appears as an continuous line, that fluidic connection may be considered a newer fluidic connection to be disconnected first.

In some embodiments, at least one step of the methods described herein is performed by a robotic manipulator. In some embodiments, each method step comprising moving a first end of a flexible conduit is performed by a robotic manipulator. In some embodiments, at least one step of the methods described herein is performed by a human. In some embodiments, each method step comprising moving a first end of a flexible conduit is performed by a human.

In some embodiments, the method further comprises providing a second plurality of fluidic connections associated with synthesis of a second chemical compound. In some embodiments, each fluidic connection of the second plurality of fluidic connections is provided by physically moving a first end of a flexible conduit from a storage port to a receiver port, thereby providing a fluidic connection between a fluid outlet and a fluid inlet of the system.

As discussed above, certain methods described herein comprise storing data associated with fluidic connections in one or more data structures. In certain embodiments, the method comprises providing data associated with a second plurality of proposed fluidic connections. In some embodiments, the data associated with each proposed fluidic connection of the second plurality of fluidic connections (e.g., a fluidic connection from a storage port to a receiver port) may comprise at least one data value associated with a location of the storage port and/or the receiver port. In some embodiments, the method comprises comparing data associated with the second plurality of proposed fluidic connections with data associated with the first plurality of fluidic connections. In this manner, fluidic connections of the first plurality of fluidic connections that are incompatible with any proposed fluidic connections of the second plurality of proposed fluidic connections may be identified. For example, if the second plurality of proposed fluidic connections comprises a fluidic connection between the first storage port and the fifth receiver port, this fluidic connection is incompatible with a fluidic connection between the first storage port and the second receiver port. In some embodiments, data associated with each incompatible fluidic connection is added to one or more second data structures.

In some embodiments, the method comprises calculating, for each fluidic connection of the first plurality of fluidic connections, a vector between the storage port and the receiver port of the fluidic connection. According to some embodiments, the method comprises adding data associated with a fluidic connection of the first plurality of fluidic connections to the one or more second data structures when the vector of the fluidic connection overlaps a vector of at least one incompatible fluidic connection and the order value of the fluidic connection is higher than the order value of the at least one incompatible fluidic connection.

In some embodiments, the method further comprises ordering data in the one or more second data structures by order value. In some embodiments, the method further comprises physically disconnecting each fluidic connection associated with data in the one or more second data structures in reverse order of order value. In some embodiments, the method further comprises removing data associated with the disconnected fluidic connections from the one or more first data structures.

In some embodiments, the method comprises providing a new fluidic connection from the second plurality of proposed fluidic connections when data associated with the new fluidic connection is absent from the one or more first data structures. In some embodiments, the new fluidic connection comprises a flexible conduit extending from a storage port of the fluid connector unit to a receiver port of the fluid connector unit.

In some embodiments, the method comprises storing data associated with the new fluidic connection in the one or more first data structures, wherein the associated data comprises an order value and at least one data value associated with a location of the storage port and/or the receiver port of the new fluidic connection.

As used herein, a direct fluid connection exists between a first component and a second component (and the two components are said to be "directly fluidically connected" to each other) when they are fluidically connected to each other such that the composition of a connecting fluid stream does not substantially change (i.e., no phase change occurs and no fluid component changes in relative abundance by more than 5%) as it flows from the first component to the second component. As an illustrative example, a first component and a second component are "directly fluidically connected" if a connecting fluid stream undergoes changes in pressure and/or temperature during passage from the first component to the second component, but not if the connecting fluid stream undergoes a separation step or a chemical reaction that substantially alters the chemical composition of the connecting fluid stream during passage from the first component to the second component.

As described above, certain embodiments of the inventive systems include one or more processors, for example, associated with a module, a fluidic distributor, or another component of the system. The processor may be part of, according to certain embodiments, a computer-implemented control system. The computer-implemented control system can be used to operate various components of the fluidic system. In general, any calculation methods, steps, simulations, algorithms, systems, and system elements described herein may be implemented and/or controlled using one or more computer-implemented control system(s), such as the various embodiments of computer-implemented systems described below. The methods, steps, control systems, and control system elements described herein are not limited in their implementation to any specific computer system described herein, as many other different machines may be used.

The computer-implemented control system can be part of or coupled in operative association with one or more modules and/or the fluidic distributor and/or other system components that might be automated, and, in some embodiments, is configured and/or programmed to control and adjust operational parameters, as well as analyze and calculate values, for example any of the module conditions described above. In some embodiments, the computer-implemented control system(s) can send and receive reference signals to set and/or control operating parameters of system apparatus. In other embodiments, the computer-implemented system(s) can be separate from and/or remotely located with respect to the other system components and may be configured to receive data from one or more systems of the invention via indirect and/or portable means, such as via portable electronic data storage devices, such as magnetic disks, or via communication over a computer network, such as the Internet or a local intranet.

The computer-implemented control system(s) may include several known components and circuitry, including a processor, a memory system, input and output devices and interfaces (e.g., an interconnection mechanism), as well as other components, such as transport circuitry (e.g., one or more busses), a video and audio data input/output (I/O) subsystem, special-purpose hardware, as well as other components and circuitry, as described below in more detail. Further, the computer system(s) may be a multi-processor computer system or may include multiple computers connected over a computer network.

The computer-implemented control system(s) may include a processor, for example, a commercially available processor such as one of the series x86, Celeron and Pentium processors, available from Intel, similar devices from AMD and Cyrix, the 680X0 series microprocessors available from Motorola, and the PowerPC microprocessor from IBM. Many other processors are available, and the computer system is not limited to a particular processor.

A processor typically executes a program called an operating system, of which WindowsNT, Windows95 or 98, Windows XP, Windows Vista, Windows 7, UNIX, Linux, DOS, VMS, MacOS and OS8 are examples, which controls the execution of other computer programs and provides scheduling, debugging, input/output control, accounting, compilation, storage assignment, data management and memory management, communication control and related services. The processor and operating system together define a computer platform for which application programs in high-level programming languages are written. The computer-implemented control system is not limited to a particular computer platform.

The computer-implemented control system(s) may include a memory system, which typically includes a computer readable and writeable non-volatile recording medium, of which a magnetic disk, optical disk, a flash memory and tape are examples. Such a recording medium may be removable, for example, a floppy disk, read/write CD or memory stick, or may be permanent, for example, a hard drive.

Such a recording medium stores signals, typically in binary form (i.e., a form interpreted as a sequence of one and zeros). A disk (e.g., magnetic or optical) has a number of tracks, on which such signals may be stored, typically in binary form, i.e., a form interpreted as a sequence of ones and zeros. Such signals may define a software program, e.g., an application program, to be executed by the microprocessor, or information to be processed by the application program.

The memory system of the computer-implemented control system(s) also may include an integrated circuit memory element, which typically is a volatile, random access memory such as a dynamic random access memory (DRAM) or static memory (SRAM). Typically, in operation, the processor causes programs and data to be read from the non-volatile recording medium into the integrated circuit memory element, which typically allows for faster access to the program instructions and data by the processor than does the non-volatile recording medium.

The processor generally manipulates the data within the integrated circuit memory element in accordance with the program instructions and then copies the manipulated data to the non-volatile recording medium after processing is completed. A variety of mechanisms are known for managing data movement between the non-volatile recording medium and the integrated circuit memory element, and the computer-implemented control system(s) that implements the methods, steps, systems control and system elements control described above is not limited thereto. The computer-implemented control system(s) is not limited to a particular memory system.

At least part of such a memory system described above may be used to store one or more data structures (e.g., look-up tables) or equations such as calibration curve equations. For example, at least part of the non-volatile recording medium may store at least part of a database that includes one or more of such data structures. Such a database may be any of a variety of types of databases, for example, a file system including one or more flat-file data structures where data is organized into data units separated by delimiters, a relational database where data is organized into data units stored in tables, an object-oriented database where data is organized into data units stored as objects, another type of database, or any combination thereof.

The computer-implemented control system(s) may include one or more output devices. Example output devices include a cathode ray tube (CRT) display, liquid crystal displays (LCD) and other video output devices, printers, communication devices such as a modem or network interface, storage devices such as disk or tape, and audio output devices such as a speaker.

The computer-implemented control system(s) also may include one or more input devices. Example input devices include a keyboard, keypad, track ball, mouse, pen and tablet, communication devices such as described above, and data input devices such as audio and video capture devices and sensors. The computer-implemented control system(s) is not limited to the particular input or output devices described herein.

It should be appreciated that one or more of any type of computer-implemented control system may be used to implement various embodiments described herein. Aspects of the invention may be implemented in software, hardware or firmware, or any combination thereof. The computer-implemented control system(s) may include specially programmed, special purpose hardware, for example, an application-specific integrated circuit (ASIC). Such special-purpose hardware may be configured to implement one or more of the methods, steps, simulations, algorithms, systems control, and system elements control described above as part of the computer-implemented control system(s) described above or as an independent component.

The computer-implemented control system(s) and components thereof may be programmable using any of a variety of one or more suitable computer programming languages. Such languages may include procedural programming languages, for example, LabView, C, Pascal, Fortran, and BASIC, object-oriented languages, for example, C++, Java, and Eiffel, and other languages, such as a scripting language or even assembly language. In some embodiments, the computer programming language is Python.

The methods, steps, simulations, algorithms, systems control, and system elements control may be implemented using any of a variety of suitable programming languages, including procedural programming languages, object-oriented programming languages, other languages and combinations thereof, which may be executed by such a computer system. Such methods, steps, simulations, algorithms, systems control, and system elements control can be implemented as separate modules of a computer program, or can be implemented individually as separate computer programs. Such modules and programs can be executed on separate computers.

Such methods, steps, simulations, algorithms, systems control, and system elements control, either individually or in combination, may be implemented as a computer program product tangibly embodied as computer-readable signals on a computer-readable medium, for example, a non-volatile recording medium, an integrated circuit memory element, or a combination thereof. For each such method, step, simulation, algorithm, system control, or system element control, such a computer program product may comprise computer-readable signals tangibly embodied on the computer-readable medium that define instructions, for example, as part of one or more programs, that, as a result of being executed by a computer, instruct the computer to perform the method, step, simulation, algorithm, system control, or system element control.

U.S. Provisional Application No. 62/490,565, filed Apr. 26, 2017, and entitled "Reconfigurable Chemical Synthesis Systems and Methods," is incorporated herein by reference in its entirety for all purposes.

Example 1

Figure 4:
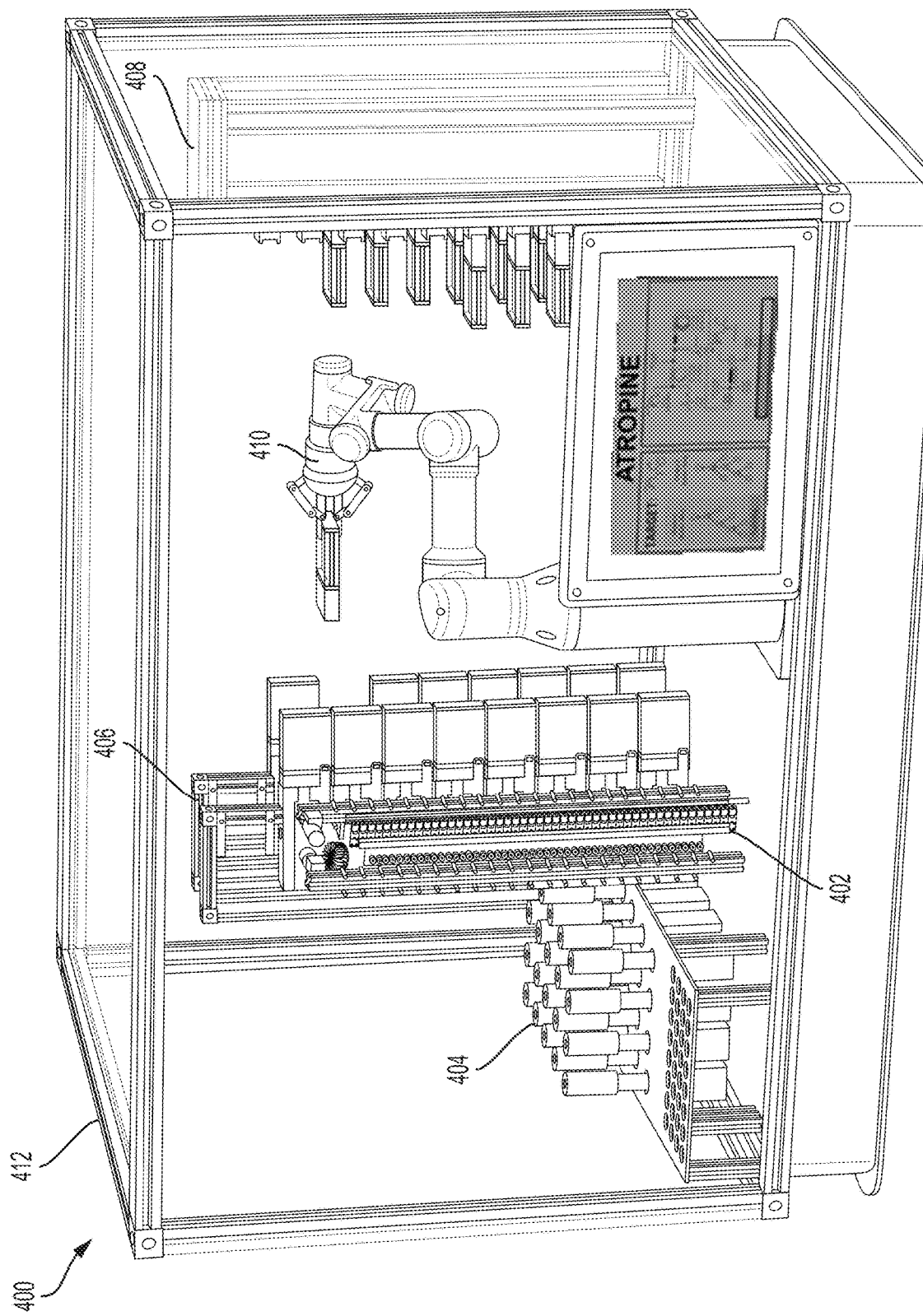
FIG. 4 is an illustration of an exemplary fluidic system, according to some embodiments.

This Example describes an exemplary reconfigurable chemical synthesis system. As shown in FIG. 4, exemplary system 400 comprised fluid connector unit 402, plurality of pumps 404, reaction unit 406, module storage unit 408, and robotic manipulator 410. The entirety of exemplary system 400 was enclosed in enclosure 412.

Figure 5A:
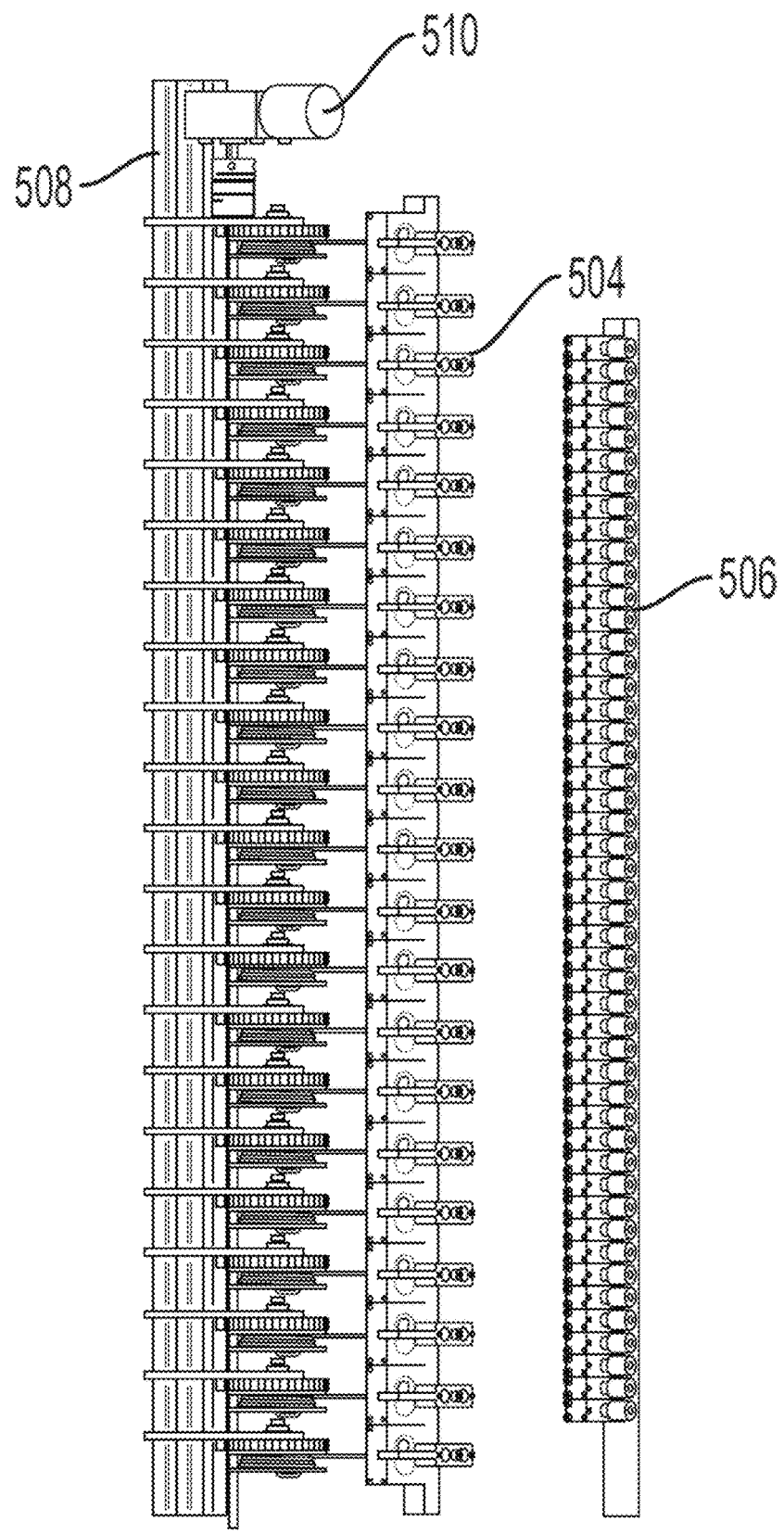
FIG. 5A is, according to some embodiments, an illustration of an exemplary fluid connector unit comprising 21 flexible conduits, a storage tower comprising 21 storage ports, and a receiver tower comprising 48 receiver ports.

FIG. 5A provides an illustration of fluid connector unit 402, which comprised flexible conduit tower 508, storage tower 504, and receiver tower 506. Flexible conduit tower 508 comprised 21 flexible conduits and 21 tensioners, and each flexible conduit of flexible conduit tower 508 was at least partially wound around one of the 21 tensioners of flexible conduit tower 508. Flexible conduit tower 508 further comprised motor 510, which drove each tensioner to apply tension to one of the 21 flexible conduits.

In addition to comprising flexible conduit tower 508, fluid connector unit 402 further comprised storage tower 504, which comprised 21 storage ports. For each flexible conduit of the 21 flexible conduits, a first end of the flexible conduit was inserted through a storage port of storage tower 504, and a fitting was secured to the first end of the flexible conduit. The fitting prevented the first end of the flexible conduit from being withdrawn through the storage port. In addition, the fitting comprised a first mating component of a kinematic coupling and two magnetic components configured to apply a preload force and facilitate alignment of the kinematic coupling.

Figure 5B:
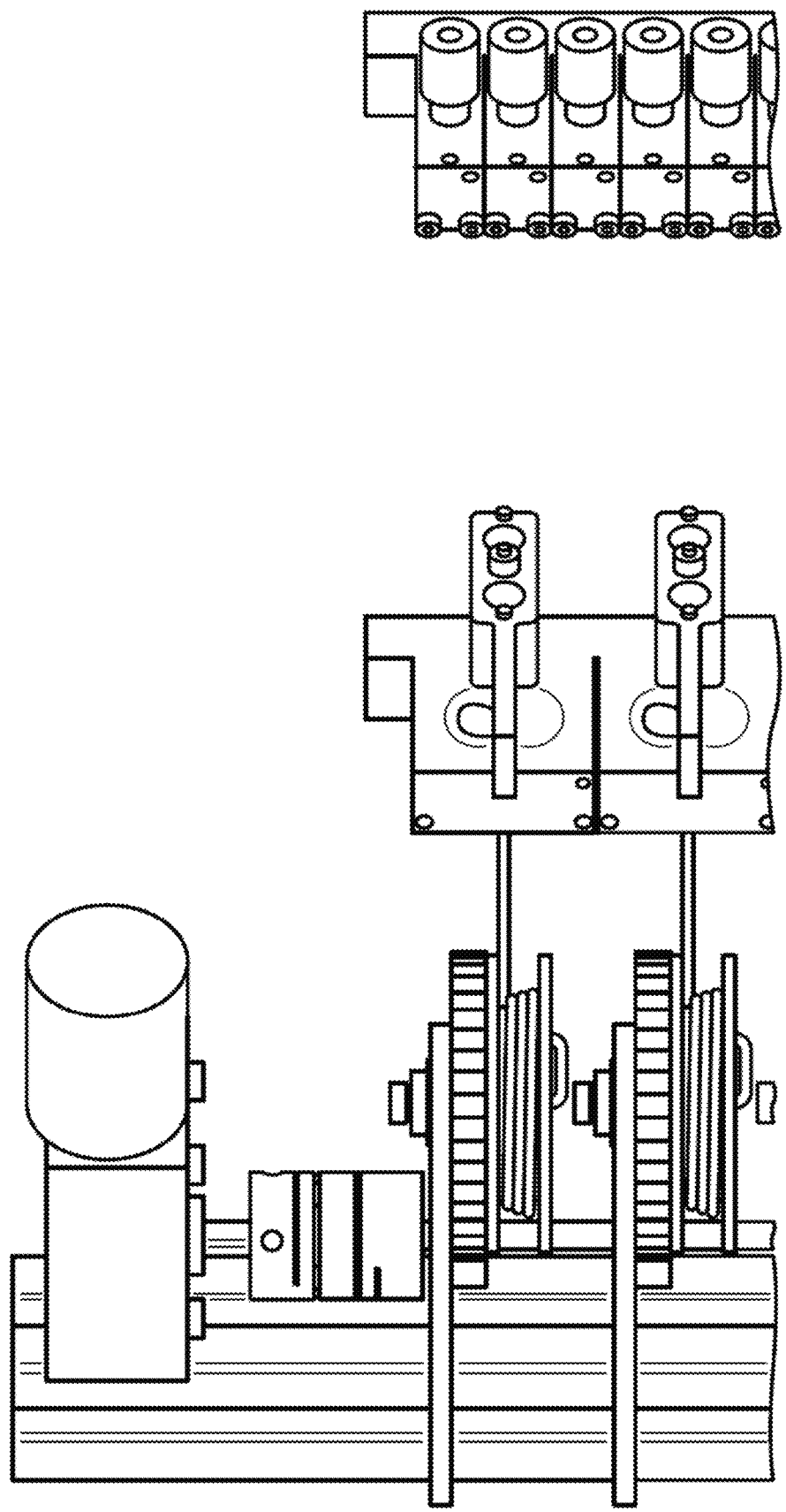
FIG. 5B is, according to some embodiments, a close-up view of the exemplary fluid connector unit of FIG. 5A.

In addition to comprising flexible conduit tower 508 and storage tower 504, fluid connector unit 402 further comprised receiver tower 506, which comprised 48 receiver ports. Each receiver port of receiver tower 506 comprised a second mating component of the kinematic coupling and two magnetic components configured to apply a preload force and facilitate alignment of the kinematic coupling. In this manner, each flexible conduit of flexible conduit tower 508 could be kinematically coupled to each receiver port of receiver tower 506, thereby providing maximum flexibility of fluidic connections. The details of an exemplary fitting secured to the first end of the first flexible conduit can more clearly be seen in FIG. 5B, which provides a close-up view of the first and second flexible conduits, first and second tensioners, first and second storage ports, and first five receiver ports of fluid connector unit 402.

Figure 6A:
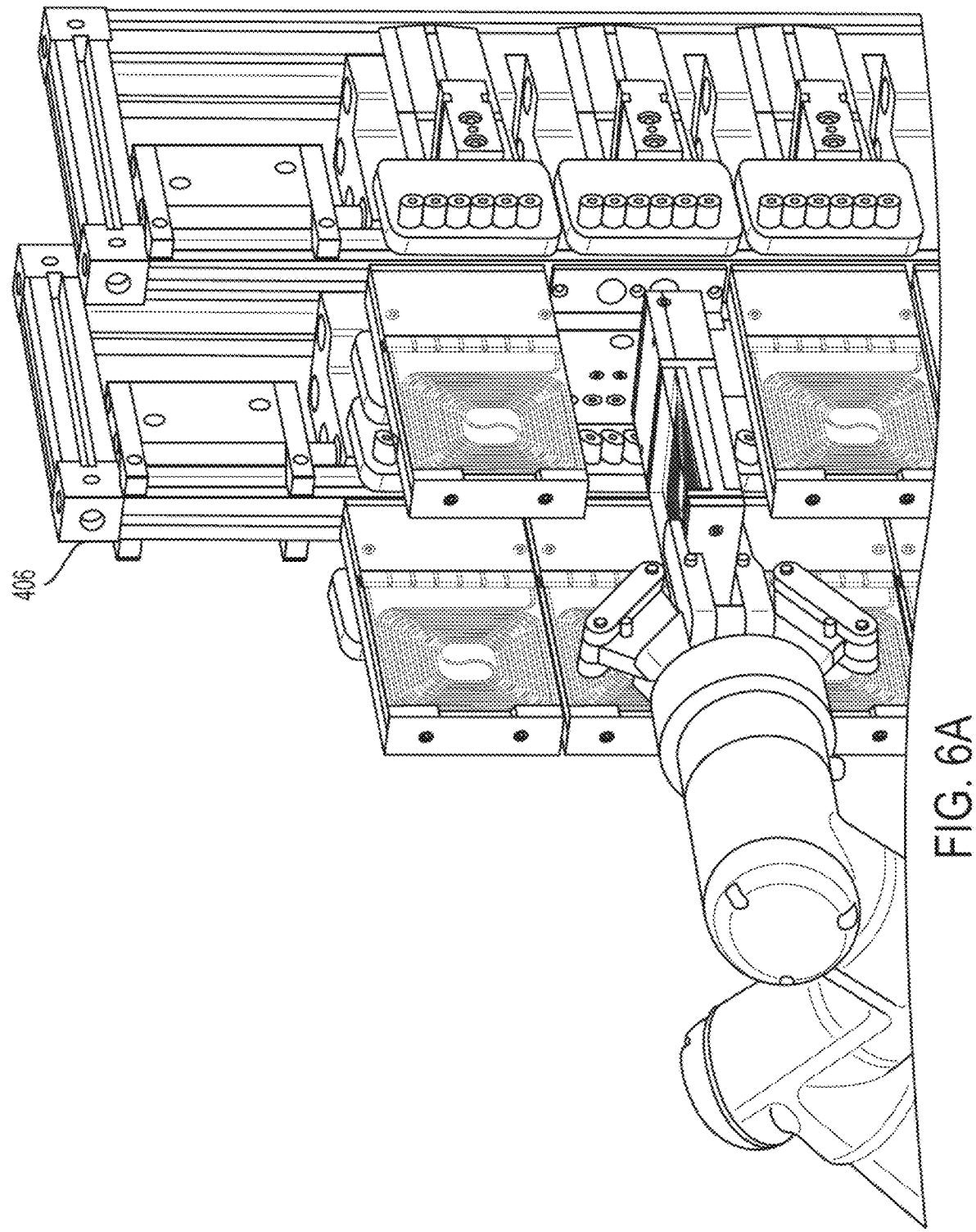
FIG. 6A is an illustration of a portion of reaction unit, according to some embodiments.
Figure 6B:
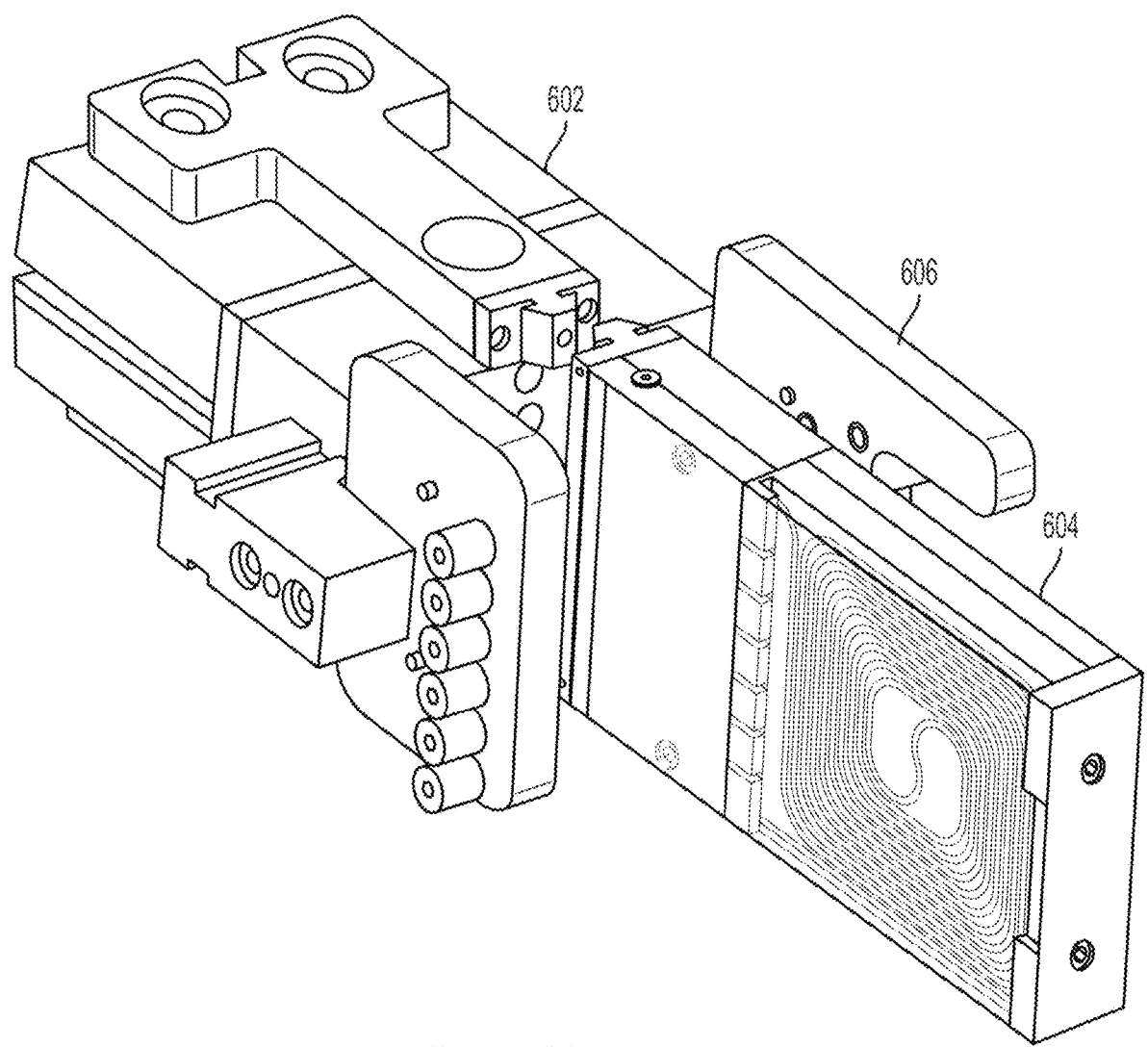
FIG. 6B is an illustration of an exemplary reaction module and an exemplary reaction bay, according to some embodiments.

In addition to fluid connector unit 402, system 400 comprised reaction unit 406. As shown in FIG. 6A, which illustrates a portion of reaction unit 406, reaction unit 406 comprised a plurality of modules (e.g., reaction modules) and a plurality of module bays, each module bay configured to receive a module. From FIG. 6B, which illustrates exemplary module bay 602 and exemplary reaction module 604, it can be seen that module bay 602 comprised actuated clamp 606, which was configured to grip reaction module 604 by applying a compressive force to reaction module 604.

Figure 7A:
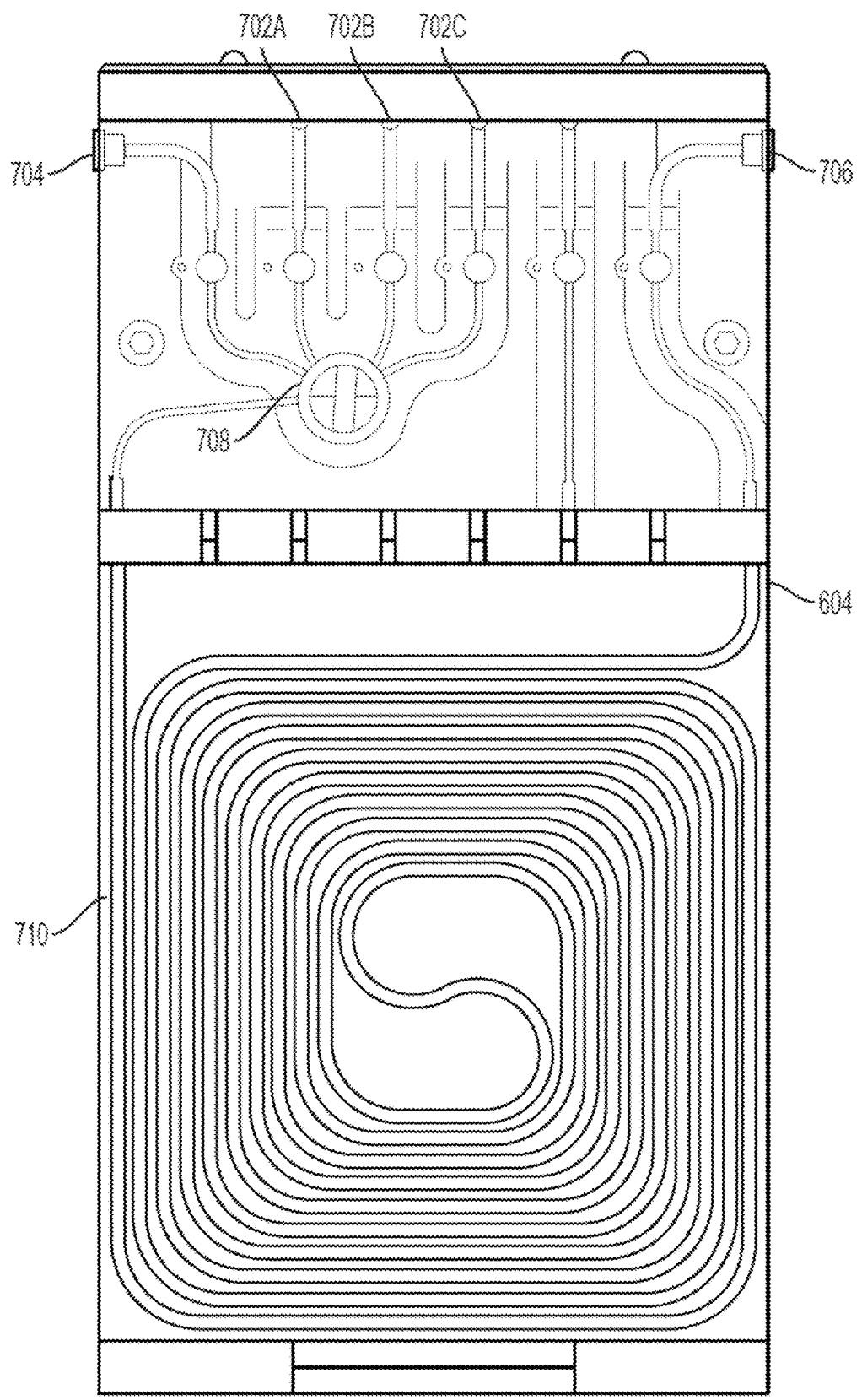
FIG. 7A is, according to some embodiments, a top-down view of an exemplary reaction module.
Figure 7C:
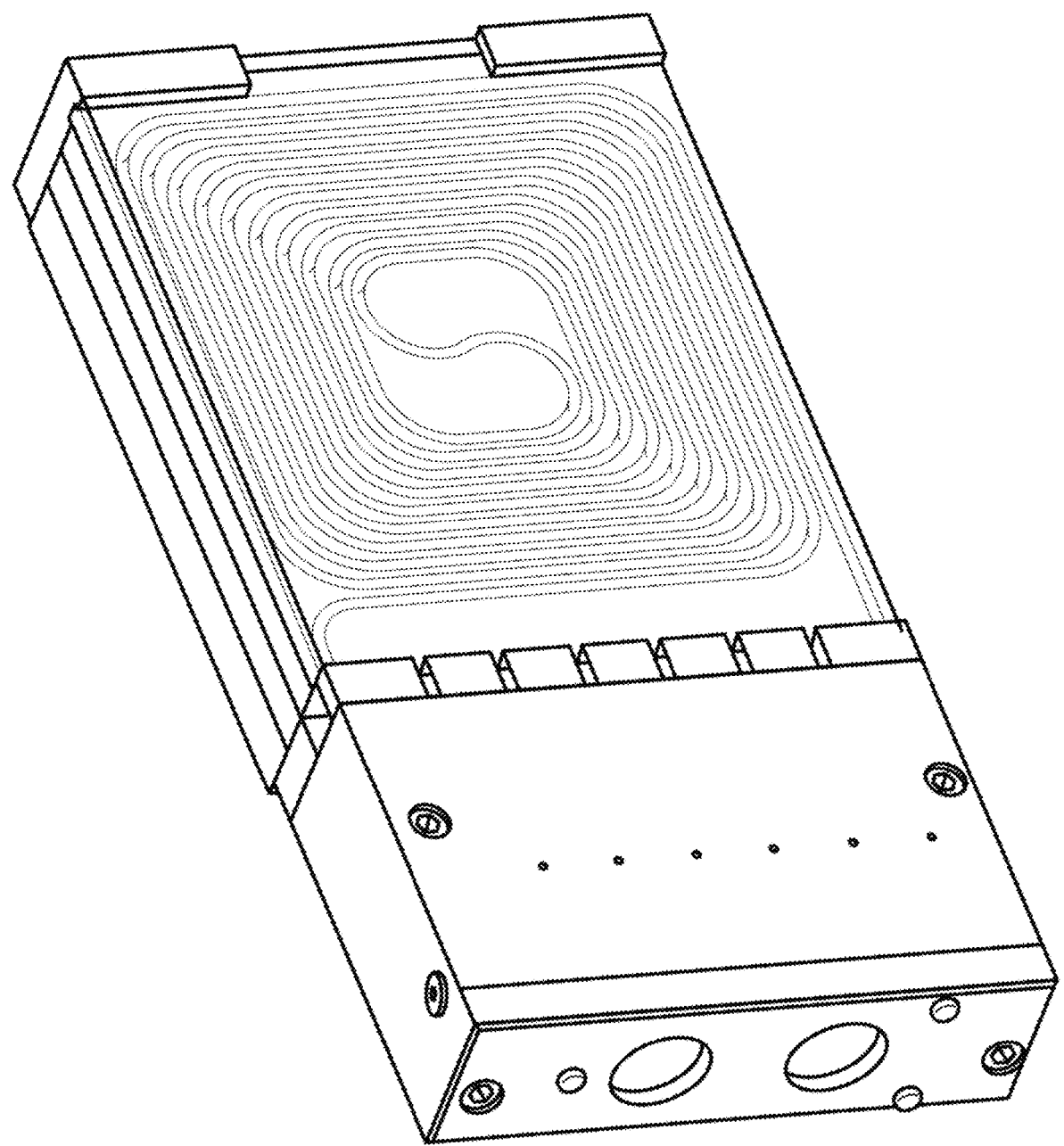
FIG. 7C is, according to some embodiments, an angled view of an exemplary reaction module.

FIGS. 7A-7C provide illustrations of exemplary reaction module 604 from different angles. For example, FIG. 7A provides a top-down view of exemplary reaction module 604. From FIG. 7A, it can be observed that reaction module 604 comprised three fluid inlets 702A-C configured to receive chemical reagents, fluid inlet 704 configured to receive a reaction intermediate from another module, and fluid outlet 706 configured to discharge an outlet stream comprising a target chemical compound (or an intermediate thereof). In addition, exemplary reaction module 604 comprised active mixer 708 and a coiled tube 710. Coiled tube 710, which was formed from PFA, provided a volume in which a chemical reaction could occur.

From FIG. 7B, which provides an angled view of exemplary reaction module 604, it can be observed that exemplary reaction module 604 further comprised fail-close valve 712 and electronics 714. Fail-close valve 712 advantageously ensured that chemical reagents and/or product streams would not leak from exemplary reaction module 604 (e.g., during transport between reaction unit 406 and module storage unit 408).

Example 2

This Example describes an exemplary method. In this method, a flexible conduit routing path plan was prepared. Initially, a configuration file comprising index joint angle locations was loaded. The start flexible conduit index number and the end flexible conduit index number were sent. A robotic manipulator was pinged for the location of the tool center point (TCP), and a proposed path to a first goal location was plotted utilizing MoveJ commands. The proposed path was checked for discontinuities in the joints of the robotic manipulator, collisions with the environment, and/or collisions of the robotic manipulator with itself. If discontinuities and/or collisions were detected, a new path was plotted. The TCP was then moved to the first goal location along the path. At the first goal location, an end effector of the robotic manipulator gripped a fitting of a first end of a flexible conduit in a storage port. The end effector was then moved forward 0.25 cm to disconnect the fitting from the storage port. Subsequently, the end effector was moved to the side 1 cm to allow traversal to a second goal location without intersecting existing connections. A proposed path to the second goal location was plotted and checked for discontinuities in the joints of the robotic manipulator and collisions with the environment. The TCP was then moved to the second goal location along the path. At the second goal location, the end effector of the robotic manipulator connected the fitting of the first end of the flexible conduit to a receiver port to provide a first fluidic connection. The end effector then released the fitting, and the configuration file was updated.

To plan the tubing routing trajectory for a particular chemical compound, the configuration file was loaded. A path was plotted from a storage index position to a receiver index position. At the storage index position, the end effector of the robotic manipulator gripped a fitting of a first end of a flexible conduit in a storage port. The end effector was then moved forward 0.25 cm to disconnect the fitting from the storage port. Subsequently, the end effector was moved to the side 1 cm to allow traversal to the receiver index position. The end effector then moved in a substantially straight line from the storage index position to the receiver index position. The receiver index position was approached by moving in by 1 cm and then moving forward by 0.25 cm. Once docked in the receiver port at the receiver index position, tension was applied to the flexible conduit. These steps were repeated for each fluidic connection to be formed for synthesis of the chemical compound.

The fluidic connections were subsequently disconnected. Utilizing a history index, the vectors of where the fluidic connections were located were plotted. The list of vectors was ordered such that the first row represented the first fluidic connection made and the last row represented the last fluidic connection made. This allowed for the determination of which flexible conduit was layered on top of another flexible conduit.

A path was plotted from a receiver index position to a storage index position to disconnect a targeted fluidic connection. Using the list of vectors, it was determined whether there were any overlapping fluidic connections that had been formed prior to the targeted fluidic connection. For any overlapping fluidic connections that had been formed prior to the targeted fluidic connection, the flexible conduit of the fluidic connection was moved from its receiver index position back to its storage index position prior to the targeted fluidic connection being disconnected. In this manner, tangling of the flexible conduits was avoided. If the path was clear, the end effector of the robotic manipulator gripped a fitting of a first end of a flexible conduit of the targeted fluidic connection and moved backwards 0.25 cm to disconnect the fitting from its receiver port. The end effector was then moved to the side 1 cm to allow traversal to the storage index position without intersecting any fluidic connections. The end effector moved in a relatively straight line from the receiver index position to the storage index position. The end effector approached the storage index position by moving in by 1 cm and then moving forward by 0.25 cm. This process was subsequently repeated for each fluidic connection targeted for disconnection.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:

physically moving a first end of a first flexible conduit from a first storage port of a first fluid connector unit to a first receiver port of the first fluid connector unit along a first path, wherein the first flexible conduit provides a first fluidic connection between a first fluid outlet and a first fluid inlet, wherein the first fluid outlet is in fluid communication with a source of a first reagent and the first fluid inlet is in fluid communication with a first module;

physically moving a first end of a second flexible conduit from a second storage port of the first fluid connector unit to a second receiver port of the first fluid connector unit along a second path after physically moving the first end of the first flexible conduit along the first path, wherein the second flexible conduit provides a second fluidic connection between a second fluid outlet and a second fluid inlet, wherein the second fluid outlet is in fluid communication with a source of a second reagent and the second fluid inlet is in fluid communication with a second module;

flowing the first reagent from the source of the first reagent to the first module;

flowing the second reagent from the source of the second reagent to the second module; and physically moving the first end of the second flexible conduit from the second receiver port to the second storage port prior to physically moving the first end of the first flexible conduit from the first receiver port to the first storage port.

2. The method of claim 1, further comprising applying tension to the first flexible conduit.

3. The method of claim 2, further comprising applying tension to the second flexible conduit.

4. The method of claim 1, wherein a difference between a length of the first flexible conduit and a shortest distance between the first storage port and the first receiver port is about 1 mm or less.

5. The method of claim 4, wherein a difference between a length of the second flexible conduit and a shortest distance between the second storage port and the second receiver port is about 1 mm or less.

* * * * *